(12) United States Patent  
Yamakawa et al.

(10) Patent No.: US 8,864,972 B2  
(45) Date of Patent: Oct. 21, 2014

(54) DIELECTROPHORESIS APPARATUS AND METHOD

(75) Inventors: Takeshi Yamakawa, Fukuoka (JP); Hiroko Imasato, Fukuoka (JP)

(73) Assignee: Kyushu Institute of Technology, Fukuoka (JP)

(*) Notice: Subject to any disclaimer, the term of this patent is extended or adjusted under 35 U.S.C. 154(b) by 727 days.

(21) Appl. No.: 12/681,616

(22) PCT Filed: Sep. 26, 2008

(86) PCT No.: PCT/JP2008/068114  
§ 371 (c)(1),  
(2), (4) Date: Apr. 2, 2010

(87) PCT Pub. No.: WO2009/044902  
PCT Pub. Date: Apr. 9, 2009

(65) Prior Publication Data  
US 2010/0219076 A1   Sep. 2, 2010

(30) Foreign Application Priority Data  
Oct. 5, 2007  (JP) .................................. 2007-262058

(51) Int. Cl.  
G01N 27/26 (2006.01)  
C25B 9/00 (2006.01)  
B03C 5/02 (2006.01)  
B03C 5/00 (2006.01)  
B01D 57/02 (2006.01)

(52) U.S. Cl.  
CPC .............. *B03C 5/026* (2013.01); *B03C 2201/26* (2013.01); *B03C 5/005* (2013.01); *B01D 57/02* (2013.01)  
USPC .......................................... 204/547; 204/643

(58) Field of Classification Search  
CPC ...... B01F 13/0001–13/001; B03C 5/00–5/028  
USPC ........ 204/547, 643; 209/127.1, 128, 130, 157  
See application file for complete search history.

(56) References Cited

U.S. PATENT DOCUMENTS 6,264,815 B1 * 7/2001 Pethig et al. ................... 204/547  
6,749,736 B1 * 6/2004 Fuhr et al. ..................... 204/643  
(Continued)

FOREIGN PATENT DOCUMENTS

CN   1990093 A   7/2007  
JP   2001-500252 T   1/2001  
(Continued)

OTHER PUBLICATIONS

Crane et al. J. Biol. Phys. (1977) 5:49-74.*  
(Continued)

*Primary Examiner* — Luan Van  
*Assistant Examiner* — Steven Rosenwald  
(74) *Attorney, Agent, or Firm* — Rabin & Berdo, P.C.

(57) ABSTRACT

Provided is a dielectrophoresis apparatus with which it is possible to handle (move, stop, separate and sort, etc.) a dielectric particle utilizing dielectrophoresis and to measure dielectrophoretic force.

The interior of a dielectrophoresis device that includes a case having a flat top or bottom surface is filled with a dielectric solution S and accepts introduction of a small target body (particle) P comprising a dielectric. A non-uniform alternating electric field is formed within the case. By tilting the case (through an angle $\theta_{pitch}$ or other direction), rotating the case in an inclined plane (through a rotational angle $\theta_{yaw}$) or adjusting the voltage and frequency of the alternating electric field, imbalance or balance is produced between a dielectrophoretic force $F_{DEP}$ that acts upon the small body and a force $F_G \sin \theta_{pitch}$ ascribable to gravity and buoyancy, thereby enabling the small body to be moved and stopped. The dielectrophoretic force $F_{DEP}$ can also be measured by using the tilt angle $\theta_{pitch}$ of the dielectrophoresis device prevailing when the small body has come to rest.

15 Claims, 30 Drawing Sheets

(56) References Cited

U.S. PATENT DOCUMENTS

| | | | |
|---|---|---|---|
| 2005/0061962 A1* | 3/2005 | Mueth et al. | 250/251 |
| 2010/0116665 A1* | 5/2010 | Kim et al. | 204/547 |

FOREIGN PATENT DOCUMENTS

| | | | |
|---|---|---|---|
| JP | 2003-066004 A | 3/2003 | |
| JP | 2003-519176 A | 6/2003 | |
| JP | 2003-527601 A | 9/2003 | |
| JP | 2005-506191 T | 3/2005 | |
| JP | 2005058840 A | 3/2005 | |
| JP | 2005-224171 A | 8/2005 | |
| JP | 2005-291870 A | 10/2005 | |
| JP | 2006-126195 A | 5/2006 | |
| WO | WO-2007-046484 A1 | 4/2007 | |
| WO | WO-2007-046485 A1 | 4/2007 | |
| WO | WO-2007-091450 A1 | 8/2007 | |
| WO | WO 2007091450 A1 * | 8/2007 | |

OTHER PUBLICATIONS

Peter Gascoyne et. al., "Microfluidic approaches to malaria detection", Acta Tropica 89 (2004) 357-369.

Haibo Li, et. al., "Dielectrophoretic separation and manipulation of live and heat-treated cells of *Listeria* on microfabricated devices with interdigitated electrodes", Sensors and Actuators B 86 (2002) 215-221.

* cited by examiner

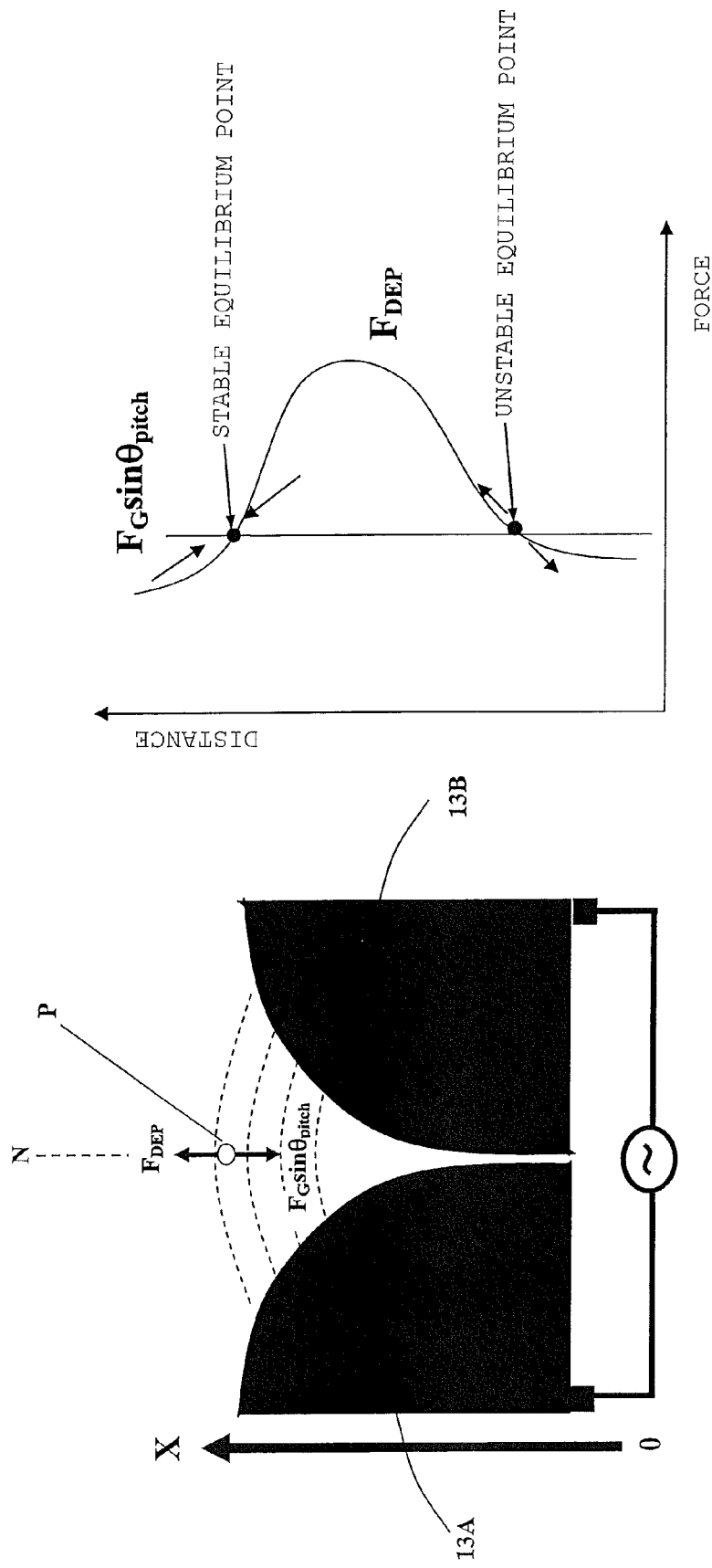

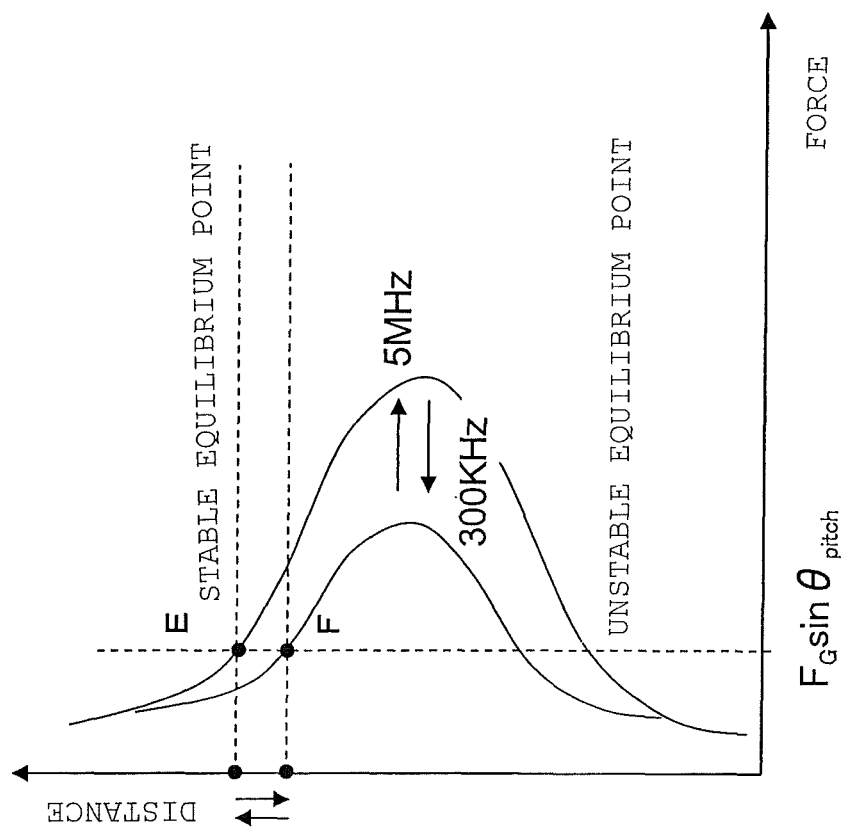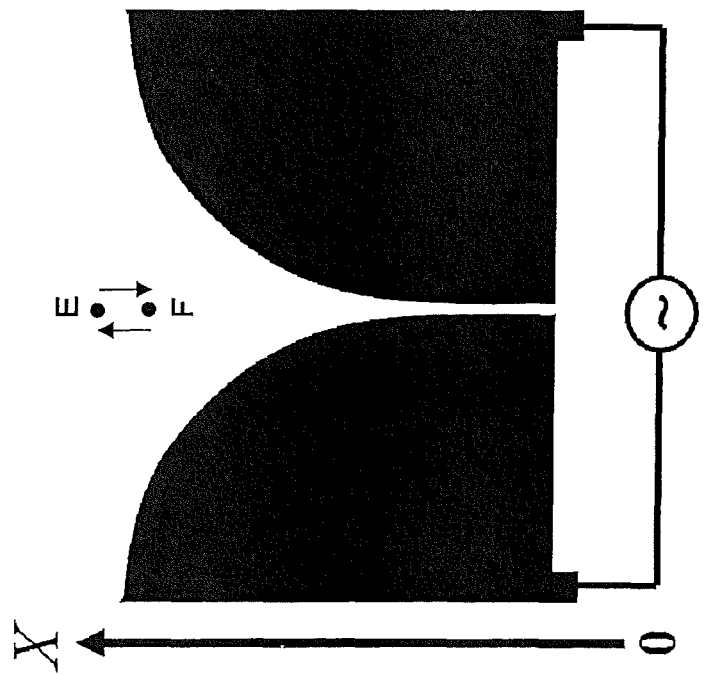
Fig. 21a
Fig. 21b

DIELECTROPHORESIS APPARATUS AND METHOD

TECHNICAL FIELD

This invention relates to a dielectrophoresis apparatus and method.

BACKGROUND ART

Dielectrophoresis refers to a phenomenon in which a substance placed in a non-uniform electric field is driven by the interaction between the electric field and a dipole moment induced by the electric field. Research is currently proceeding utilizing this phenomenon in various fields especially in regard to the separation and identification of biological samples. For example, refer to the following literature:

H. Li and R. Bashir, "Dielectrophoretic separation and manipulation of live and heat-treated cells of Listeria on microfabricated devices with interdigitated electrodes", Sensors and Actuators B: Chemical, vol. 86, no. 2-3, pp. 215-221, 2002.

P. Gascoyne, J. Satayavivad and M. Ruchirwat, "Microfluidic approaches to malaria detection", Acta Tropica, vol. 89, pp. 357-369, 2004.

Although measurement of the driving force, i.e., the dielectrophoretic force, produced in a specific substance is extremely important, obtaining a concrete numerical value of the force is not easy. Generally, since it is nearly impossible to determine analytically a dielectrophoretic force produced by designed electrodes, the force is found by calculation using the finite element method. This method, however, does not measure the actual dielectrophoretic force.

DISCLOSURE OF THE INVENTION

An object of the present invention is to provide a dielectrophoresis apparatus with which it is possible to not only measure dielectrophoretic force but also to handle a small target body that includes or has a dielectric portion, such handling including moving, stopping, separating, excluding and sorting the body.

The present invention further provides a device (apparatus) suited to the above-mentioned electrophoresis apparatus.

The present invention further provides methods of handling and sorting the above-mentioned small target body and a method of measuring dielectrophoretic force. These methods can be implemented in ideal fashion using the above-mentioned dielectrophoresis apparatus.

A dielectrophoresis apparatus according to the present invention comprises: a case for being filled with a dielectric solution and for admitting a small target body that includes a dielectric portion; an electrode device including a plurality of electrodes for forming within the case a non-uniform alternating electric field that produces at least one stable equilibrium point in relation to balance between a dielectrophoretic force acting upon the small target object inside the case and a force ascribable to gravity and buoyancy; and a tilting mechanism for holding and tilting the case and the electrode device.

When an alternating voltage is applied to the electrodes of the electrode device, a non-uniform electric field can be produced inside the case. The dielectrophoretic force that acts upon the small body is dependent upon the intensity and gradient of the non-uniform alternating electric field applied. The force ascribable to gravity and buoyancy depends upon the angle of tilt of the case. The tilt angle can be obtained by the above-mentioned tilting mechanism. When the above-mentioned two forces are not in balance, i.e., when an imbalance is produced, the small body travels through the solution. The direction and velocity of this movement can be adjusted using either the tilt direction and angle of the case or the voltage or frequency thereof applied to the electrodes. That is, handling of the small body becomes possible.

When the above-mentioned two forces are in balance, the small body comes to rest (this is the above-mentioned stable equilibrium point). Since the dielectrophoretic force is equal to the force ascribable to gravity and buoyancy when the small body is at rest, the dielectrophoretic force will be found if the force ascribable to gravity and buoyancy is calculated. Since the force ascribable to gravity and buoyancy depends upon the tilt angle of the case, the dielectrophoretic force can be measured if the tilt angle that prevails when the small body is brought to rest by changing the tilt angle is measured.

The above-described dielectrophoresis apparatus further comprises a rotating mechanism for rotating the case and the electrode device in a plane having a tilt determined by the tilting mechanism.

In a case where the dielectrophoretic force and force ascribable to gravity and buoyancy are not in exactly opposite directions, the dielectrophoretic force and force ascribable to gravity and buoyancy can be brought into balance by rotating the case in the inclined plane by utilizing the rotating mechanism. Naturally, the movement of the small body can be controlled positively by producing an imbalance by rotating the case and electrode device using the rotating mechanism. The rotating mechanism can be exploited in the handling of the small body as well.

In a preferred embodiment, the electrodes in the electrode device are such that mutually opposing sides of a plurality (pair) of electrodes are in line symmetry with respect to a center line between the electrodes, extend in parallel from one end to the other thereof with a narrowed electrode spacing between them and are further formed into a curve in such a manner that the electrode spacing gradually increases. The pair of electrodes produce a stable equilibrium point and an unstable equilibrium point.

The dielectrophoresis apparatus further comprises an alternating voltage generating unit for generating an alternating voltage, at least the frequency or voltage of which is variable, applied to the plurality of electrodes.

In a preferred embodiment, the angle of tilt produced by the tilting mechanism and the angle of rotation produced by the rotating mechanism are measurable. Angle measurement may be performed visually or automatically using sensors.

The present invention further provides a device (apparatus) ideal for use in the above-described dielectrophoresis apparatus. The device comprises a case for being filled with a dielectric solution and for introducing a small target body that includes a dielectric portion; and a plurality of electrodes for forming a non-uniform alternating electric field within the case; wherein mutually opposing sides of the plurality of electrodes are in line symmetry with respect to a center line between the electrodes, extend in parallel from one end to the other thereof with a narrowed electrode spacing between them and are further formed into a curve in such a manner that the electrode spacing gradually increases.

In one embodiment, the case is provided with an opening for drawing in or discharging the small target body.

In another embodiment, the case is provided with an injection port for injecting a dielectric solution into the case, and with a discharge port for discharging the dielectric solution.

Such a case can be utilized in the separation, exclusion and sorting, etc., of small bodies.

A method of handling a small body according to the present invention comprises: filling the interior of a case with a dielectric solution and admitting a small target body that includes a dielectric portion; forming a non-uniform alternating electric field within the case; and adjusting at least one of the intensity and frequency of the non-uniform alternating electric field and direction and angle of tilt of the case, producing an imbalance between a dielectrophoretic force acting upon the small target body inside the case and a force ascribable to gravity and buoyancy, and causing the small target body to move in a desired direction. After the small body has been moved, it can be stopped at a desired position (stable equilibrium point).

A method of sorting small bodies according to the present invention comprises: filling the interior of a case with a dielectric solution and admitting small target bodies of a plurality of different types, each target body including a dielectric portion; forming a non-uniform alternating electric field within the case; and adjusting at least one of the intensity and frequency of the non-uniform alternating electric field and direction and angle of tilt of the case, producing an imbalance between a dielectrophoretic force acting upon the small target bodies inside the case and a force ascribable to gravity and buoyancy, and causing the small target bodies of the plurality of different types to move in individual directions, and causing a small target body of a desired type to stop at a desired stable equilibrium point.

A method of measuring dielectrophoretic force of a small body according to the present invention comprises: filling the interior of a case with a dielectric solution and admitting a small target body that includes a dielectric portion; forming a non-uniform alternating electric field within the case; adjusting at least one of the intensity and frequency of the non-uniform alternating electric field and direction and angle of tilt of the case, balancing a dielectrophoretic force acting upon the small target body inside the case and a force ascribable to gravity and buoyancy, and causing the small body to come to rest; and calculating dielectrophoretic force using a tilt angle of the case in a prescribed direction prevailing when the small body is brought to rest.

The present invention is applicable to all dielectrics or to small bodies that partially include a dielectric portion inclusive of biological cells.

BRIEF DESCRIPTION OF THE DRAWINGS

FIG. 4a illustrates forces acting upon a particle, in which the particle is shown on a central axis and the forces are in balance;

FIG. 4b is a graph illustrating a profile of dielectrophoretic force and an oblique component force of gravity;

FIG. 21a illustrates positions of a particle in frequency step response, and FIG. 21b is a graph illustrating a stable equilibrium point at every frequency;

BEST MODE FOR CARRYING OUT THE INVENTION (1) Dielectrophoresis and Dielectrophoretic Force When a dielectric particle is placed in a dielectric solution and a non-uniform (intensity of an electric field differs depending upon location) alternating electric field is applied, a force $F_{DEP}$ (this force will be referred to as "dielectrophoretic force") given by the following equation acts upon the dielectric particle and the particle is moved in the solution (in the non-uniform alternating electric field) by this dielectrophoretic force (this phenomenon is referred to as "dielectrophoresis"):

$$F_{DEP} = 2\pi \in_0 \in_m r^3 Re(f_{CM}) \nabla E_{rms}^2 \quad \text{Eq. (1)}$$

where $\in_0$ represents the permittivity in vacuum, $\in_m$ the relative permittivity of the solution, r the radius of the particle (assumed to be spherical), and $Re(f_{CM})$ the real part of the Clausius-Mosotti equation, which is expressed by Equation (2). $E_{rms}$ expresses the intensity of the alternating electric field as the root-mean-square value.

$$R_e(f_{CM}) = R_e\{(\in_p^* - \in_m^*)/(\in_p^* + 2\in_m^*)\} \quad \text{Eq. (2)}$$

where $\in_p^*$ and $\in_m^*$ are the complex relative permittivities of the particle and solution, respectively.

In a case where $\in_p < \in_m$ holds, a dielectrophoretic force in the direction of a sparse electric field distribution acts upon the particle (this is referred to as "negative dielectrophoresis"), and in a case where $\in_p > \in_m$ holds, a dielectrophoretic force in the direction of a dense electric field distribution acts upon the particle (this is referred to as "positive dielectrophoresis").

Classification (filtering) and characteristic evaluation of uncharged particles in a solution, particularly biological cells (normal cells and cancerous cells of erythrocytes and leukocytes, malaria-parasitized erythrocytes and various bacteria, etc.) and DNA cells, etc., are very difficult when particle size is several microns or less. Handling these target bodies also is not easy.

Since the direction and magnitude of the dielectrophoretic force differ depending upon whether the permittivity of particles (inclusive of the above-mentioned biological cells) is larger or smaller than the permittivity of the solution (solvent), this makes possible the handling of particles, such as the moving and stopping of particles, the separation or sorting of mixed particles (inclusive of the above-mentioned biological cells) and the identification of specific particles (inclusive of the above-mentioned biological cells).

(2) Balancing Dielectrophoretic Force and Gravity, and Applications Thereof.

Figure 1:
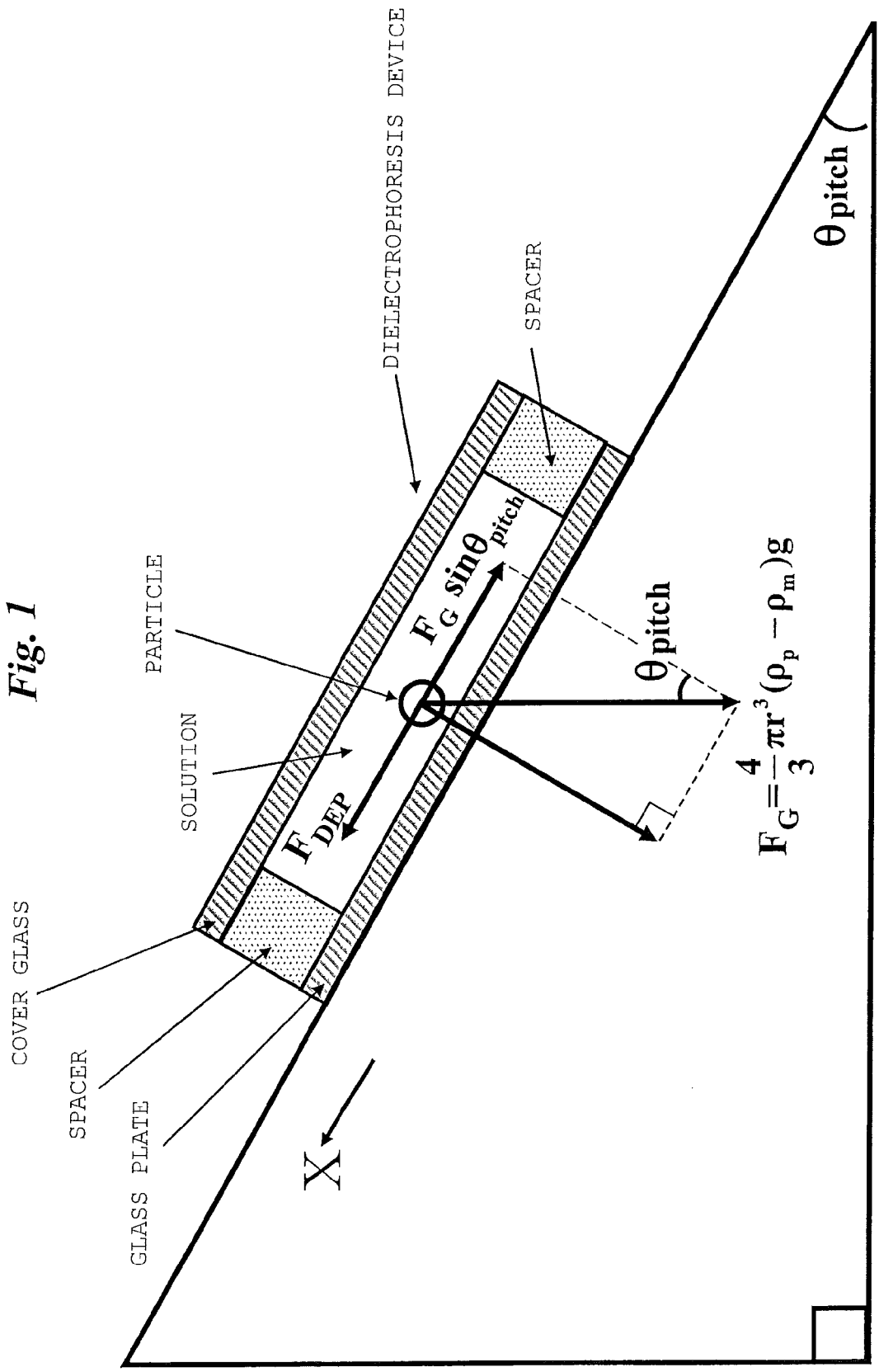
FIG. 1 illustrates the principle of balance between an oblique component force of gravity and a dielectrophoretic force acting upon a dielectric particle.

Consider a dielectrophoresis device (apparatus) (referred to as a "DEP device" below) (a case) in which a particle is accommodated in a solution, as illustrated in FIG. 1. This DEP device is such that a frame serving as a spacer is secured to the periphery of a flat glass plate (lower plate), the interior of a space delimited by the spacer is filled with a solution, a particle is introduced into this space and this is covered from above by a flat cover glass (upper plate) to form a space (hermetically sealed) the interior of which is filled with the solution. Electrodes for forming a non-uniform alternating electric field inside the (hermetically sealed) space are provided on the glass plate, etc., although this will be described in detail later.

The gravitational force on the particle and a buoyant force ascribable to the solution act upon the particle inside the DEP device. If the gravitational force is greater than the buoyant force, a force $F_G$ (referred to simply as "gravity" below) that acts upon the particle is given by the equation below. [In a case where the buoyant force is greater than the gravitational force on the particle, then the discussion below will apply throughout in similar fashion if $(\rho_p - \rho_m)$ is replaced by $(\rho_m - \rho_p)$ and the direction of the force acting upon the particle is made an upwardly-acting force].

$$F_G = (4/3)\pi r^3 (\rho_p - \rho_m) g \quad \text{Eq. (3)}$$

where $\rho_p$ represents the density of the particle, $\rho_m$ the density of the solution and g the gravitational acceleration.

The DEP device set forth above is placed on an inclined surface. Let the tilt angle of the inclined surface be represented by $\theta_{pitch}$, and let the direction upward along the inclined surface be the direction of the X axis.

The component force of gravity $F_G$ directed downward parallel to the inclined surface is $F_G \sin \theta_{pitch}$ (this component will be referred to as the "oblique component force of gravity" below). A non-uniform alternating electric field is applied so that a dielectrophoretic force $F_{DEP}$ directed upward parallel to the inclined surface acts upon the particle in the solution. If these forces $F_G \sin \theta_{pitch}$ and $F_{DEP}$ are in balance, the particle will come to rest.

The following equation holds in this state (the state in which the dielectric particle is at rest):

$$F_{DEP} - F_G \sin \theta_{pitch} = 0 \quad \text{Eq. (4)}$$

That is, if a state in which $F_{DEP} > F_G \sin \theta_{pitch}$ or $F_{DEP} < F_G \sin \theta_{pitch}$ holds can be produced by changing the tilt angle $\theta_{pitch}$ of the inclined surface, then the dielectric particle can be made to move upward or downward along the inclined surface, and the dielectric particle can be brought to rest by producing a state in which Equation (4) holds. (This constitutes handling of the particle.)

If all of the parameters r, $\rho_p$, $\rho_m$ g and $\theta_{pitch}$ that represent $F_G \sin \theta_{pitch}$ are known, then the dielectrophoretic force $F_{DEP}$ can be measured using Equation (4) by producing a state in which Equation (4) holds. (This is referred to as the "null method".) Further, if $\in_0$, $\in_m$ and $\in_p$ are known, then the value of intensity E of the electric field can be calculated from Equations (1) and (2).

The characterizing features of this method of measuring dielectrophoretic force are as follows:

Since the particle is at rest, measurement error due to viscosity resistance can be eliminated.

Balance can be achieved and the particle brought to rest by changing the angle $\theta_{pitch}$ of the inclined surface. [Although it is possible, as a matter of course, to bring the particle to rest also by changing the intensity (applied voltage or frequency) of the alternating electric field that produces the dielectrophoretic force, this need not necessarily be carried out.]

(3) Structure and Characterizing Features of DEP Device

Figure 2:
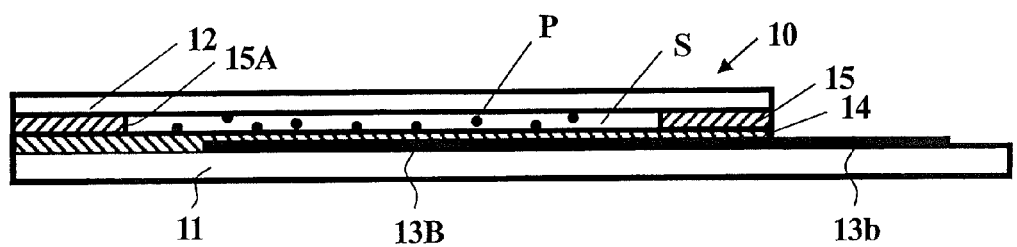
FIG. 2 is a sectional view illustrating a DEP device.
Figure 3:
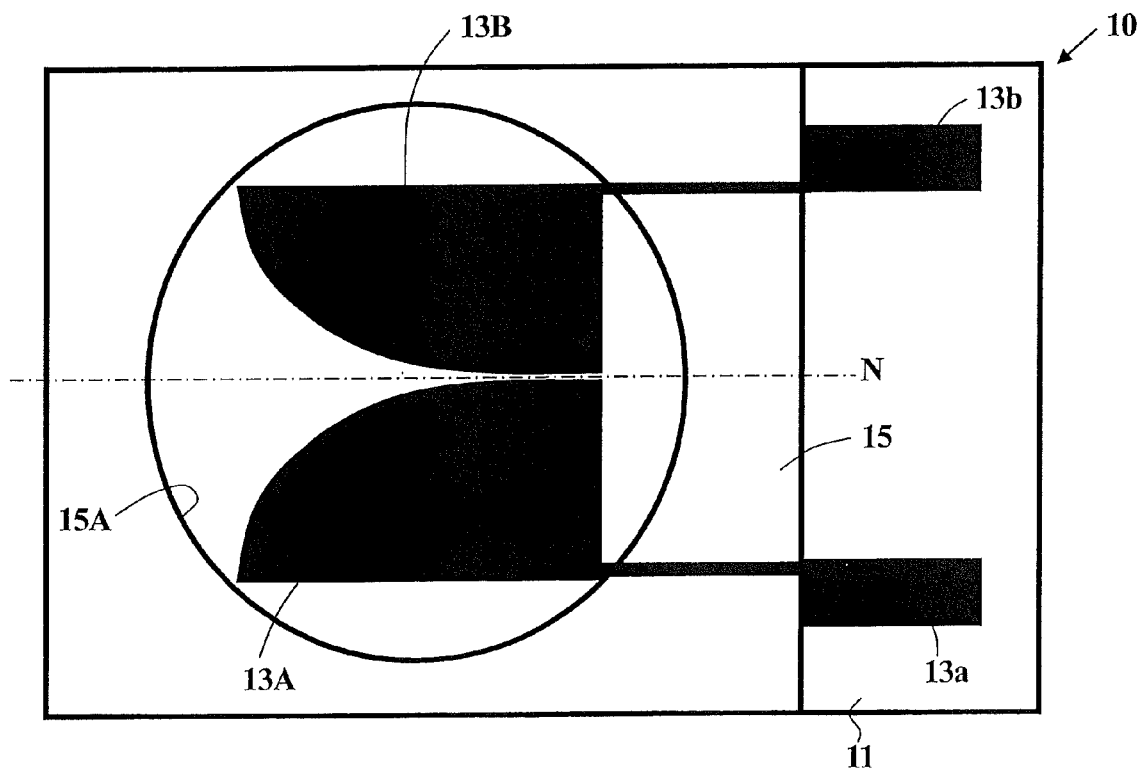
FIG. 3 is a plan view of the DEP device from which a cover glass has been removed.

An example of the construction of a DEP device 10 is illustrated in FIGS. 2 and 3.

A pair of left and right electrodes (Creek-Gap electrodes) 13A, 13B are formed on the flat surface of a glass plate 11 substantially at the center thereof. The electrodes 13A, 13B are such that mutually opposing sides thereof first extend in parallel with a very small spacing between them over a length that is one-third to one-fourth of the electrode length, from one side, i.e., the right side in FIG. 3 (the side situated at the lower portion of the inclined surface when the device is placed on the inclined surface) (this side will be referred to as the "lower end" or "terminal side" below), to the other side, i.e., the left side in FIG. 3 (the side situated at the upper portion of the inclined surface when the device is placed on the inclined surface) (this side will be referred to as the "upper end" below), and then are formed into a curve in such a manner that the spacing gradually increases (and the ratio of increase also increases). Wiring patterns extend from the lower ends of the respective electrodes 13A, 13B and lead to electrode terminals 13a, 13b formed at the terminus of the glass plate 11. Imagine a line passing between the above-mentioned sides of the electrodes 13A, 13B. This line will be referred to as the center line N between the electrodes. The electrodes 13A and 13B are line-symmetrical with respect to the center line N.

The electrodes 13A, 13B, wiring patterns and terminals 13a, 13b can be obtained by forming an aluminum thin film on the surface of the glass plate 11 by sputtering and then patterning the thin film using photolithography.

An insulating film 14 (e.g., photosensitive polyimide having a thickness of 1 μm or less) is formed on the surface of the glass plate 11, inclusive of the electrodes 13A, 13B and wiring patterns, and the surface of the film is flat and parallel to the surface of the glass plate 11. The insulating film 14 is not formed on the right end portion of the glass plate 11 that includes the terminals 13a, 13b.

A spacer 15 having a circular hole 15A is placed on and fixed to the insulating film 14. The position and size of the hole 15A are decided in such a manner that the electrodes 13A, 13B fit completely into the hole 15A. The spacer 15 can be fabricated from silicone rubber (having a thickness of 100 μm), by way of example.

The hole 15A in the spacer 15 is filled with dielectric solution S (e.g., distilled water) having the relative permittivity $\in_m$, and one or a plurality of dielectric particles P (e.g., polystyrene beads having a diameter of 9.9 μm) having the relative permittivity $\in_p$ are introduced into the hole 15A.

It is so arranged that air will not penetrate into the space (15A) into which the solution S and particles P have been introduced, and a cover glass 12 is placed on and secured to the spacer 15. This completes the fabrication of a case filled with the dielectric solution and into which the dielectric particles (small target bodies) have been introduced.

By applying a high-frequency voltage across the terminals 13a, 13b, a non-uniform alternating electric field is formed between the electrodes 13A and 13B (between the above-mentioned two sides of the electrodes) in the space defined by the hole 15A and filled with the solution S. If expressed in terms of the above-described example, the permittivity of the polystyrene beads is less than that of the distilled water S. Accordingly, negative dielectrophoresis is produced, a dielectrophoretic force directed toward the larger electrode spacing acts upon the polystyrene beads (particles P) and the polystyrene beads travel in this direction (leftward in FIG. 3) if the DEP device 10 is placed in a horizontal attitude.

Such DEP device 10 is placed on the inclined surface shown in FIG. 1, the terminal side of the device being situated on the lower end. For the sake of simplicity, it will be assumed that a single dielectric particle P exists on the center line N in the space within the DEP device 10. Further, it will be assumed that the inclination of the center line N is $\theta_{pitch}$. As mentioned above, the dielectrophoretic force $F_{DEP}$ directed upward along the inclined surface and the oblique component force $F_G \sin \theta_{pitch}$ of gravity directed downward along the inclined surface act upon the particle P. This is illustrated in FIGS. 4a and 4b. In FIG. 4b, the dielectrophoretic force $F_{DEP}$ is indicated by the curve and the oblique component force $F_G \sin \theta_{pitch}$ of gravity is indicated by the straight line (and varies depending upon the tilt angle $\theta_{itch}$). Points of intersection between these two forces $F_{DEP}$ and $F_G \sin \theta_{pitch}$ are points (referred to as "equilibrium points") where the two forces are in balance, as described above.

There are two equilibrium points in Creek-Gap electrodes. The reason is that the dielectrophoretic force $F_{DEP}$ exhibits a curve profile having a peak at its center, as illustrated in FIG. 4b. At the lower ends of the electrodes, the electric field strength is large because the spacing between the two electrodes 13A and 13B is very small. Since the opposing sides of the left and right electrodes 13A, 13B are parallel, the electric field is not inclined and, hence, no dielectrophoretic force is produced. On the other hand, at the upper ends of the electrodes, the electrode spacing is very large, the electric field strength and its inclination are very small and the dielectrophoretic force is substantially zero. As a result, the dielectrophoretic force has the peak at its center.

Of the two equilibrium points, the upper one is a stable equilibrium point. That is, the dielectrophoretic force $F_{DEP}$ that acts upon a particle lower than this equilibrium point is greater than the oblique component force $F_G \sin \theta_{pitch}$ of gravity and the particle rises toward the equilibrium point. The dielectrophoretic force $F_{DEP}$ that acts upon a particle higher than this equilibrium point is smaller than the oblique component force $F_G \sin \theta_{pitch}$ of gravity and the particle falls toward the equilibrium point. Since the particle moves toward this equilibrium point in either case, this equilibrium point is a stable equilibrium point. Conversely, the lower equilibrium point is an unstable equilibrium point because a particle that is above or below this equilibrium point is acted upon by a force that moves the particle in a direction away from this equilibrium point.

Figure 5A:
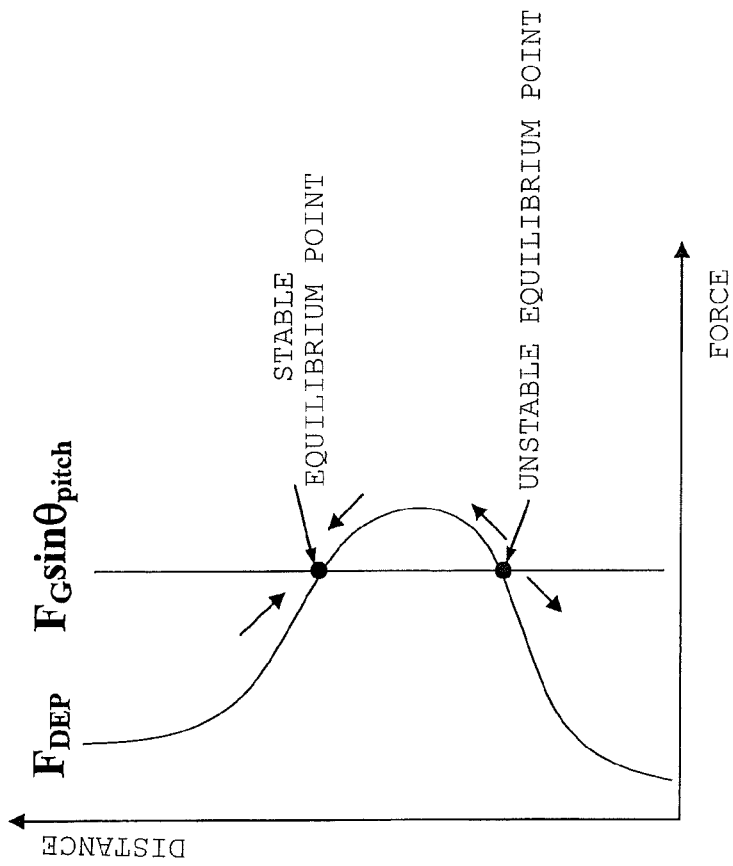
FIG. 5a is a graph illustrating forces acting upon a particle when the DEP device has been turned upside down.
Figure 5B:
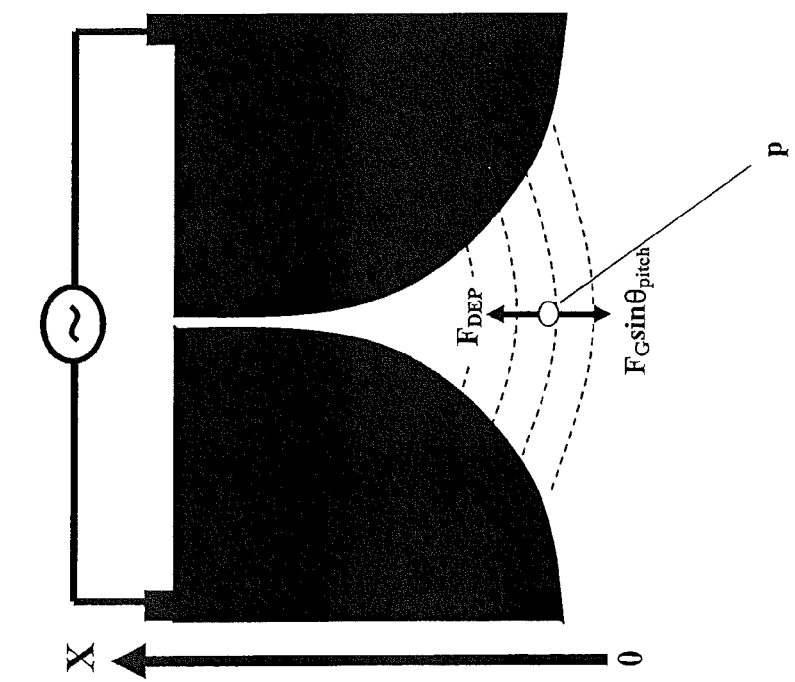
FIG. 5b is a graph illustrating a profile of dielectrophoretic force and the oblique component force of gravity, which are produced at this time.

FIG. 5a illustrates the DEP device in a manner in which it has been placed on the inclined surface upside-down as compared with FIG. 4a. FIG. 5b illustrates the profile of the dielectrophoretic force that acts upon a dielectric particle at this time. In this case also two equilibrium points are produced and one of them is a stable equilibrium point.

Thus, a DEP device having Creek-Gap electrodes is capable of assuring one stable equilibrium point and of bringing to rest (stopping) a particle in a stable state regardless of whether the dielectrophoretic force is positive or negative.

The foregoing is a case where the particle P is present on the center line N between the electrodes.

Figure 6:
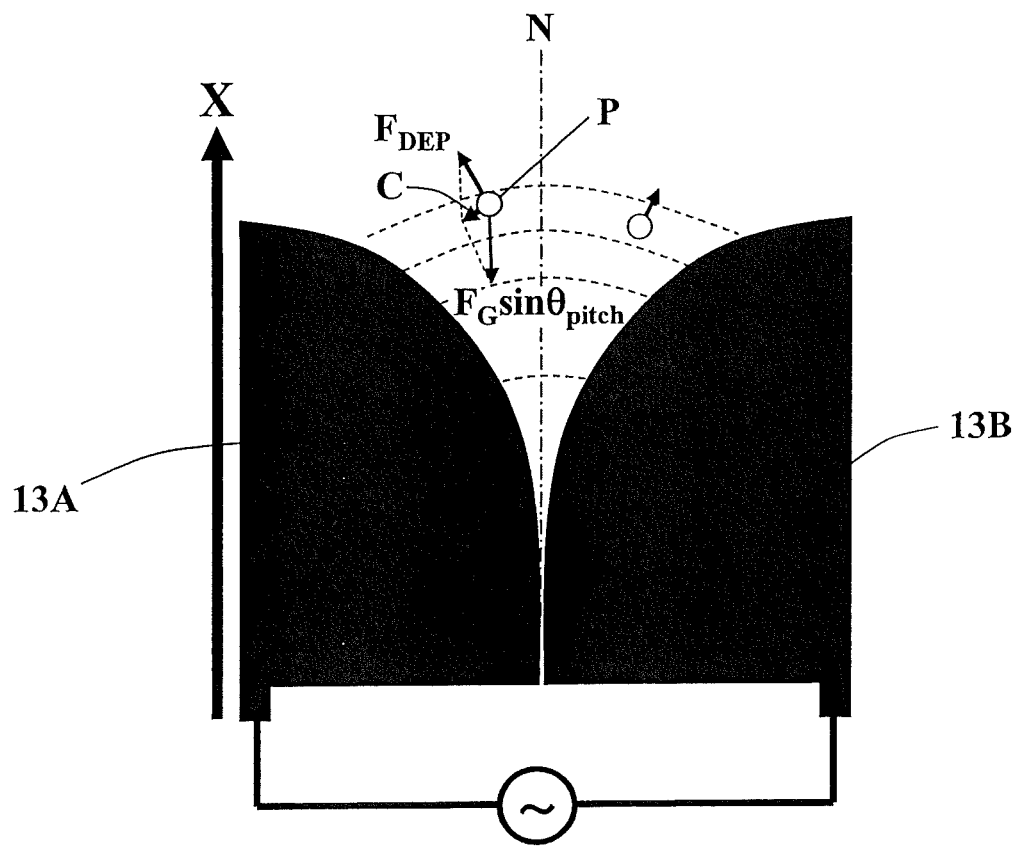
FIG. 6 illustrates forces acting upon a particle, in which the particle is shown displaced from a central axis and a resultant force is produced.

In a case where the particle P is not on the center line N, as illustrated in FIG. 6, the direction of the dielectrophoretic force $F_{DEP}$ is not parallel to the center line N but is inclined with respect to the center line N. Since the oblique component force $F_G \sin \theta_{pitch}$ of gravity acts in a direction parallel to the center line N, a resultant force C of these forces is produced and the particle P travels through the solution owing to the force C.

Figure 7:
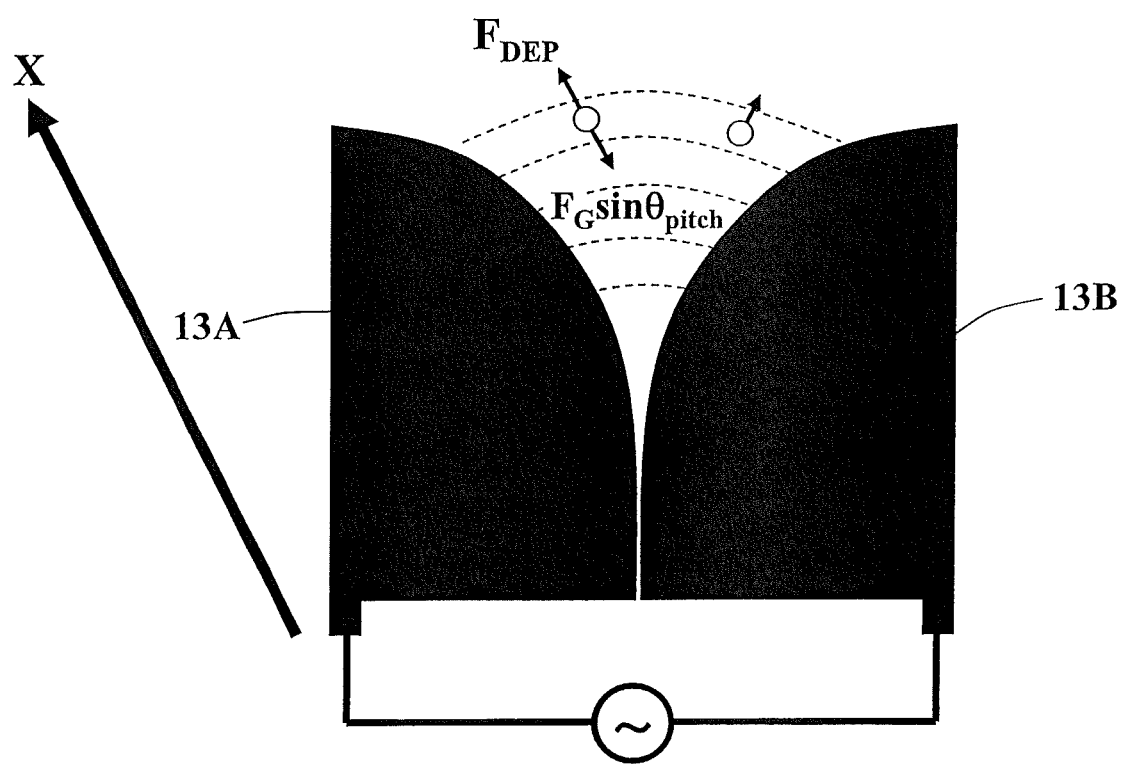
FIG. 7 illustrates forces acting upon a particle, in which the particle is shown displaced from a central axis and the forces are in balance.

In order to arrange it so that gravitational force will act in a direction that cancels the resultant force C, the DEP device 10 is rotated on the inclined surface. (A rotary disk 50 on which the DEP device 10 has been placed is rotated, as will be described later). (The angle of rotation is represented by $\theta_{yaw}$.) Accordingly, at a certain angular position $\theta_{yaw}$ of the DEP device 10 (rotary disk 50), the dielectrophoretic force $F_{DEP}$ and the oblique component force $F_G \sin \theta_{pitch}$ of gravity are balanced and the particle comes to rest (stops), as illustrated in FIG. 7. That is, a stable equilibrium point exists in this case. In addition, Equation (4) holds at this time as well.

In a case where the particle does not exist on the center line N, therefore, it is possible for the particle to be moved and stopped (to be moved not only on the center line N but also in a direction that crosses the center line N). The dielectrophoretic force $F_{DEP}$ can also be calculated by Equations (3), (4) using the conditions that prevail when the particle is at rest.

Figure 8:
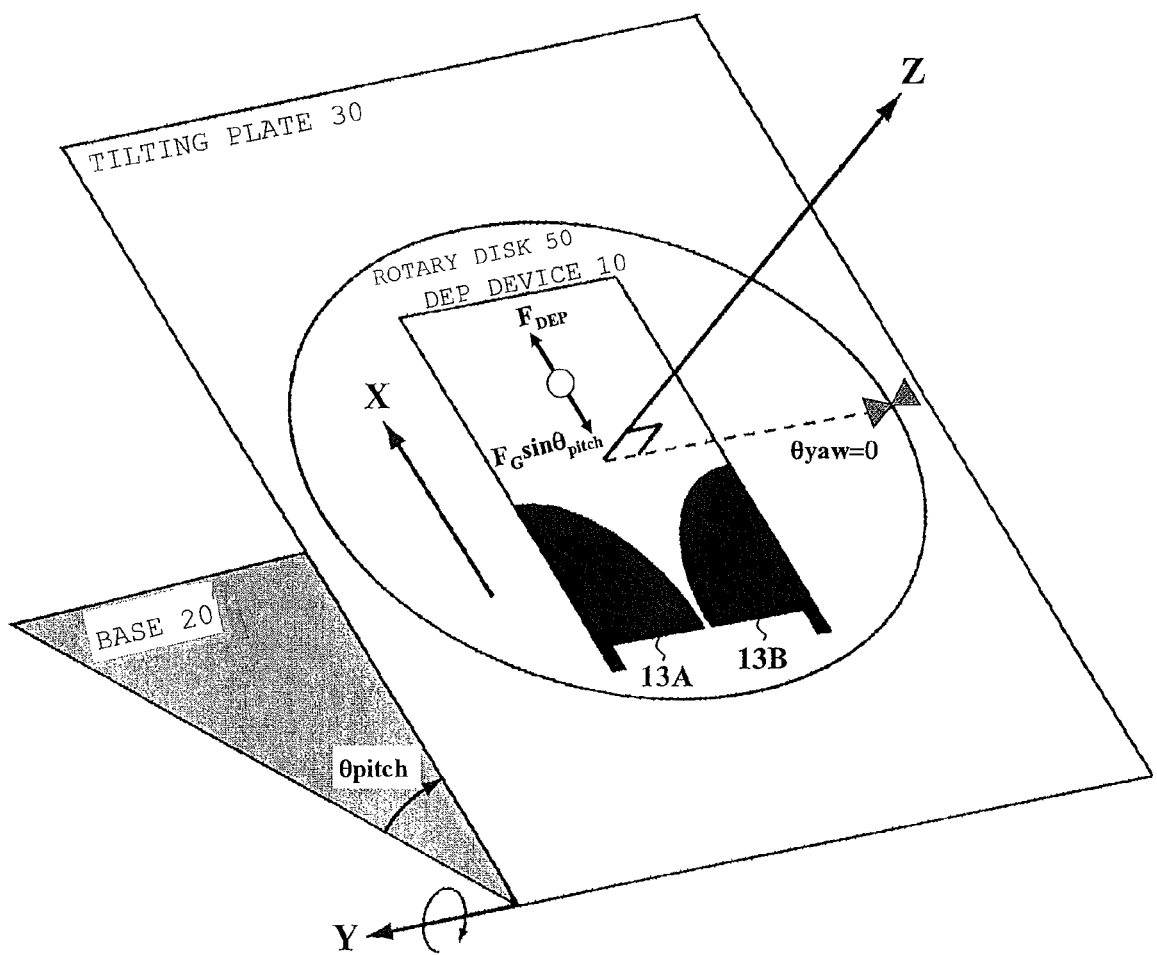
FIG. 8 illustrates the placement relationship between a tilting plate and a rotary disk, namely the inclination of a DEP device.
Figure 9:
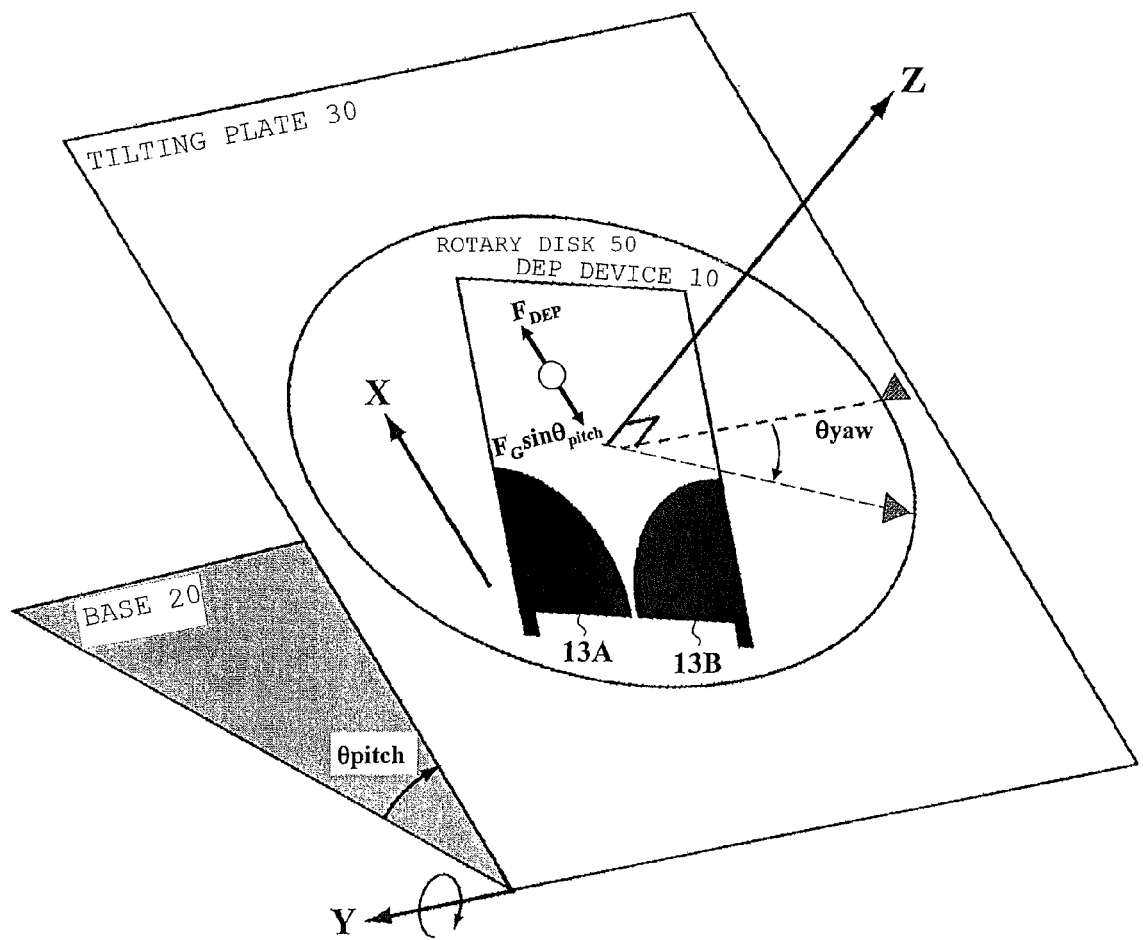
FIG. 9 illustrates the placement relationship between a tilting plate and a rotary disk, namely the rotation of a DEP device.
Figure 10:
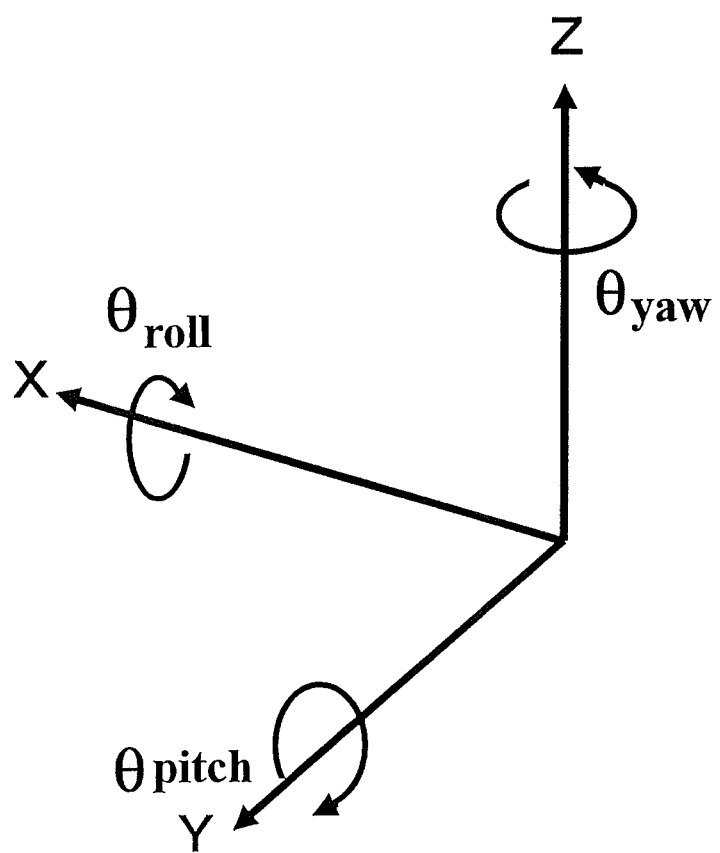
FIG. 10 illustrates coordinate axes.
Figure 11B:
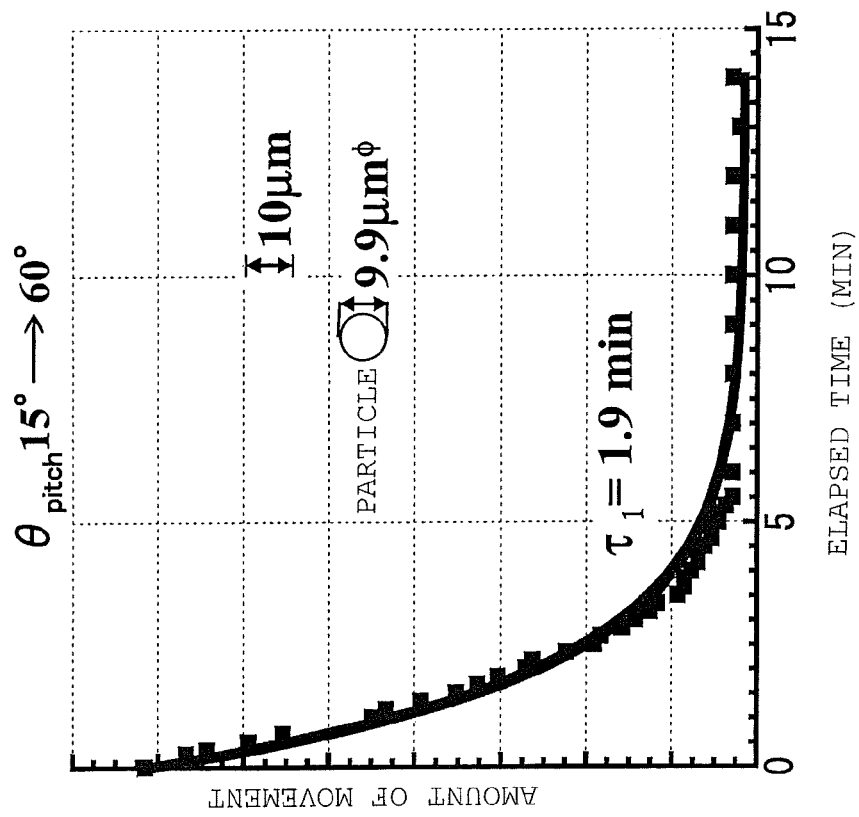
FIGS. 11a and 11b are graphs illustrating amounts of movement of a particle, with the passage of time, when an angle $\theta_{pitch}$ is changed suddenly from 60° to 15° and from 15° to 60°, respectively.
Figure 11A:
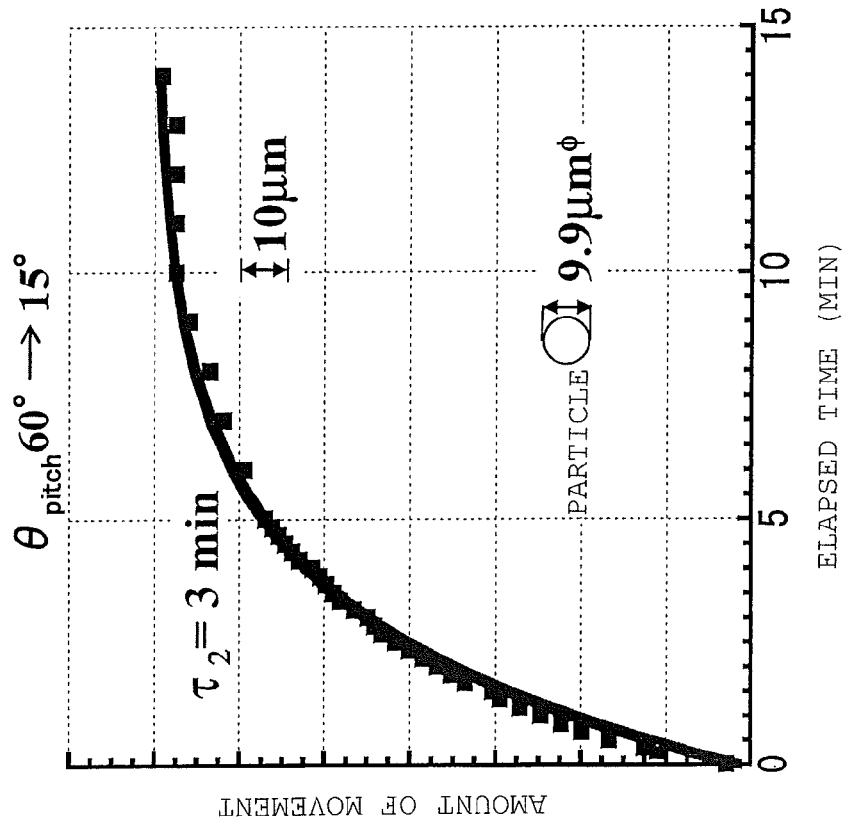
Figure 12:
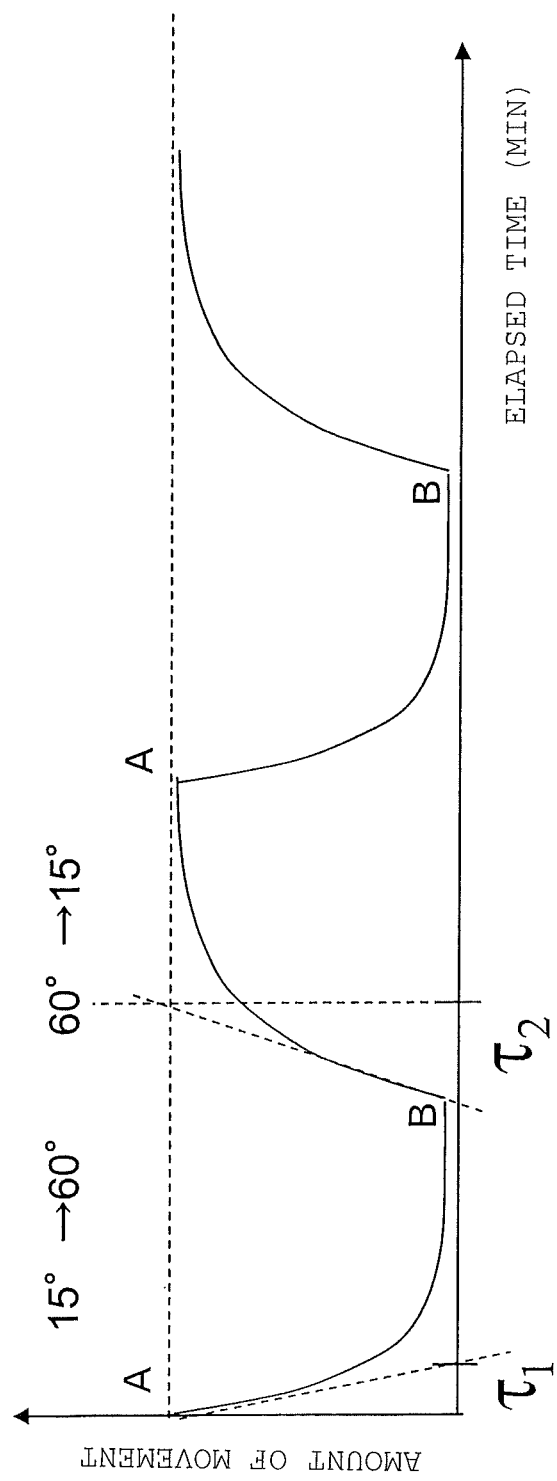
FIG. 12 is a graph illustrating successive angular step responses over a plurality of times.
Figure 13B:
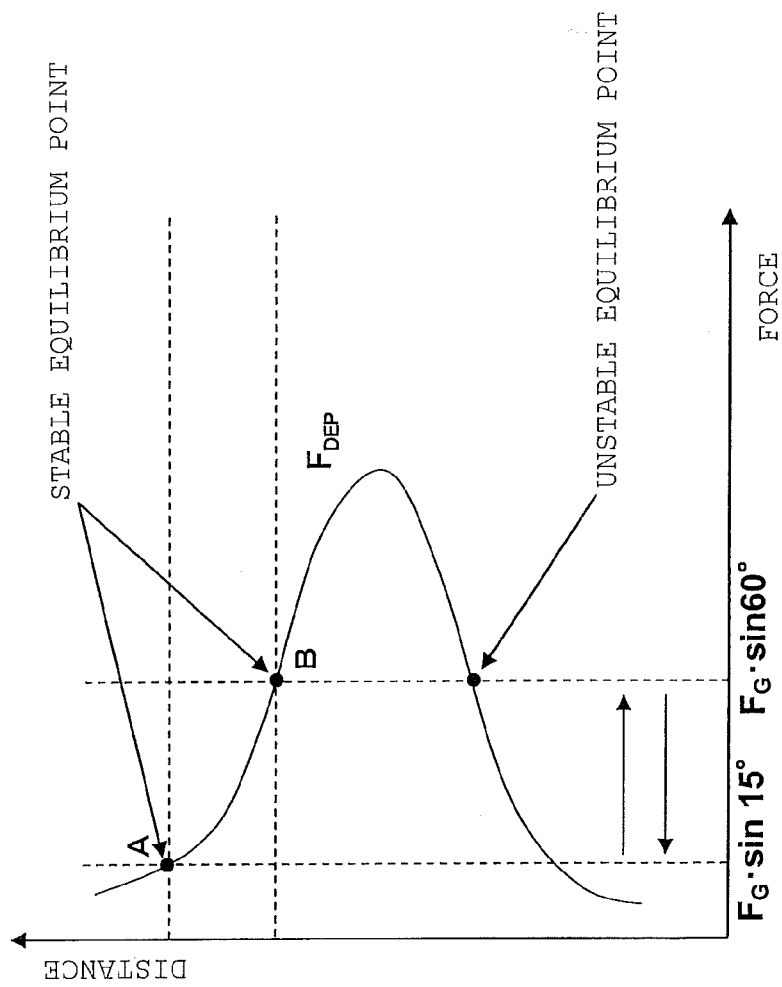
FIG. 13b is a graph illustrating a stable equilibrium point at every angle.
Figure 13A:
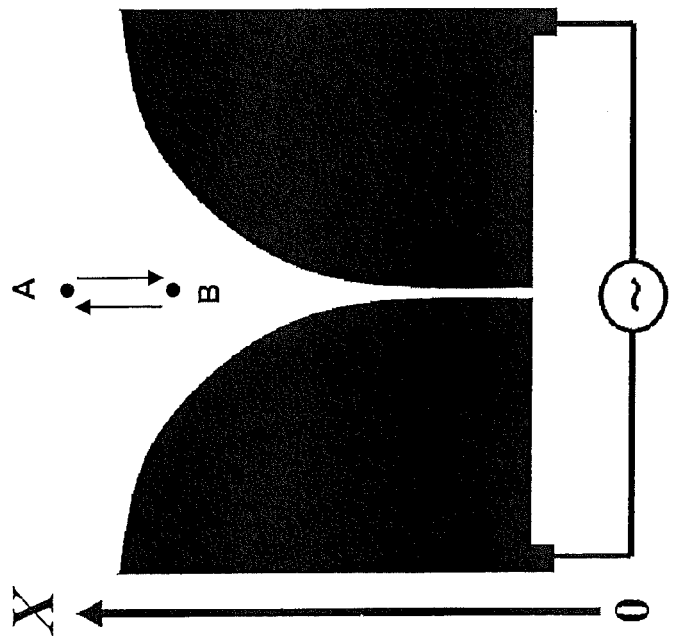
FIG. 13a illustrates positions of a particle in angular step response.

The position, angular relationship and coordinate axes of a tilting plate 30 that forms the inclined surface and the rotary disk 50 that holds the DEP device 10 and rotates it on the inclined surface (tilting plate 30) are all illustrated in FIGS. 8 to 10 in simple fashion in order to link to the dielectrophoresis apparatus described next.

As illustrated in FIG. 1, the direction along the tilting plate 30 is the X axis, the direction perpendicularly intersecting the X axis and extending along the surface of the tilting plate 30 is the Y axis, and the direction orthogonal to the surface of the tilting plate 30 is the Z axis (this is a coordinate system different from the X and Y axes of an XY table 41 described later). The tilt angle $\theta_{pitch}$ of the tilting plate 30 corresponds to rotation about the Y axis. Rotation of the rotary disk 50 corresponds to rotation $\theta_{yaw}$ about the Z axis. It should be appreciated that the above-mentioned resultant force C can be cancelled by rotating the rotary disk 50. The tilt angle $\theta_{pitch}$ of the tilting plate 30 is related to the magnitude of the dielectrophoretic force $F_{DEP}$, and the rotation angle $\theta_{yaw}$ of the rotary disk 50 represents the direction of the dielectrophoretic force $F_{DEP}$.

(4) Dielectrophoresis Apparatus and Method

An example of a dielectrophoresis apparatus is illustrated in FIGS. 25 to 31. This dielectrophoresis apparatus can also be used as a dielectrophoretic force measurement apparatus, an apparatus for handling dielectric particles and an apparatus for sorting dielectric particles, and various methods (a dielectrophoretic force measurement method and methods of handling and sorting) can be implemented.

A tilting mechanism will be described with reference to FIGS. 25 and 26. The tilting plate 30 is pivotally attached at the lower edge thereof on a base 20 so as to be free to tilt. Specifically, a plurality of bearings 21 are secured on the base 20. A plurality of mounting portions 32 in which shaft holes have been formed are formed as an integral part of the lower edge of the tilting plate 30. A rotary shaft 31 is passed through the shaft holes of these mounting portions 32 and is fixed to the mounting portions. The shaft 31 is received in the bearings 31 in freely rotatable fashion. A rotation transducer (e.g., a potentiometer) 25 for detecting the angle of rotation of the rotary shaft 31 is mounted on the base 20 (or on one of the bearings 21).

Figure 27:
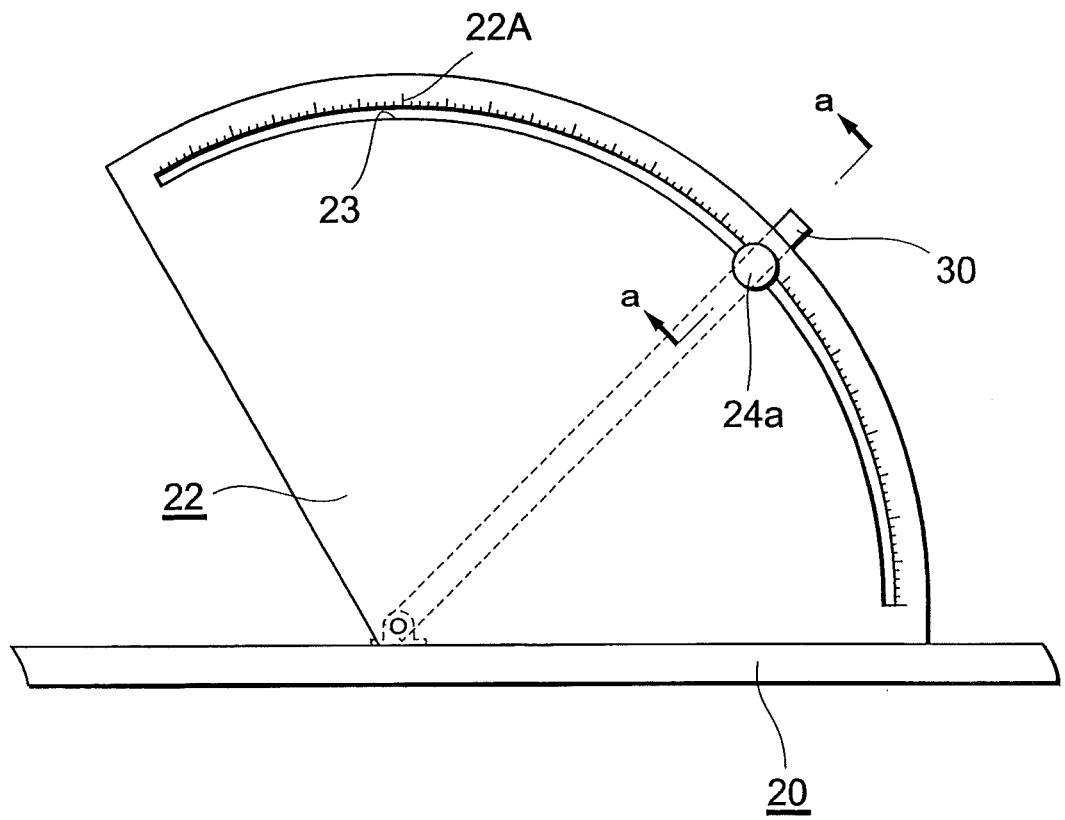
FIG. 27 is a side view illustrating a structure for fixing positioning of a tilting plate in a dielectrophoresis apparatus.
Figure 28:
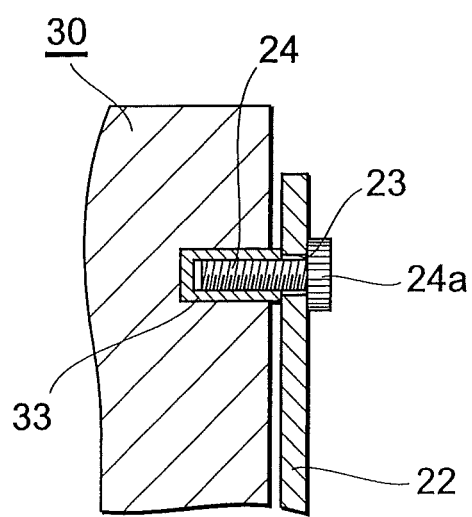
FIG. 28 is an enlarged sectional view taken along line a-a in FIG. 27.

With reference to FIGS. 27 and 28 in particular, a sector-shaped positioning plate 22 is provided on one side of the base 20 in an upright attitude perpendicular to the surface of the base 20. A positioning groove 23 is formed in an arcuate shape in the positioning plate 22 near an arcuate edge thereof. A slide 33 in which threads have been formed and which protrudes slightly from the side of the tilting plate 30 is provided on one side of the tilting plate 30 at a location that moves along the positioning groove 23 as the tilting plate 30 is tilted. A lock screw 24 having a knob 24a is inserted loosely into the positioning groove 23 from the outer side of the positioning plate 22 and is screwed into the threaded hole of the slide 33.

The tilting plate 30 forms the above-mentioned inclined surface. By rotating the tilting plate 30 manually about the rotary shaft 31 as center, the tilting plate 30 can be brought to any angular position where the value of $\theta_{pitch}$ is between at least 0° and 90°. The tilting plate 30 can be secured at the positioned point by tightening the lock screw 24. The angular position (the angle $\theta_{pitch}$) of the tilting plate 30 can be obtained in the form of an electrical signal by an output from the rotation transducer 25 or can be determined visually by providing the positioning plate 22 with angle graduations 22A. The angle $\theta_{pitch}$ when the tilting plate 30 is horizontal is assumed to be 0°.

Figure 25:
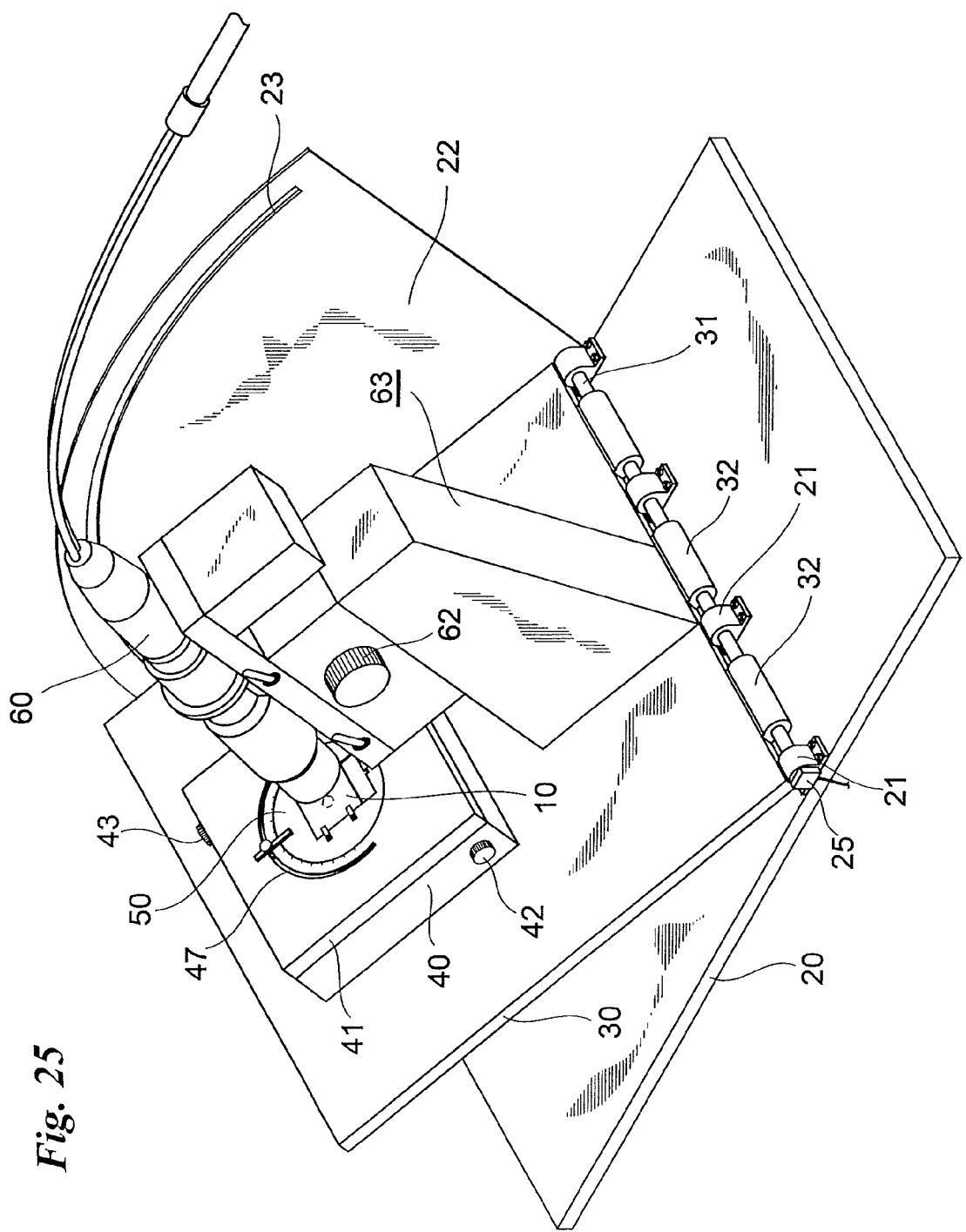
FIG. 25 is a perspective view illustrating the overall configuration of a dielectrophoresis apparatus.
Figure 26:
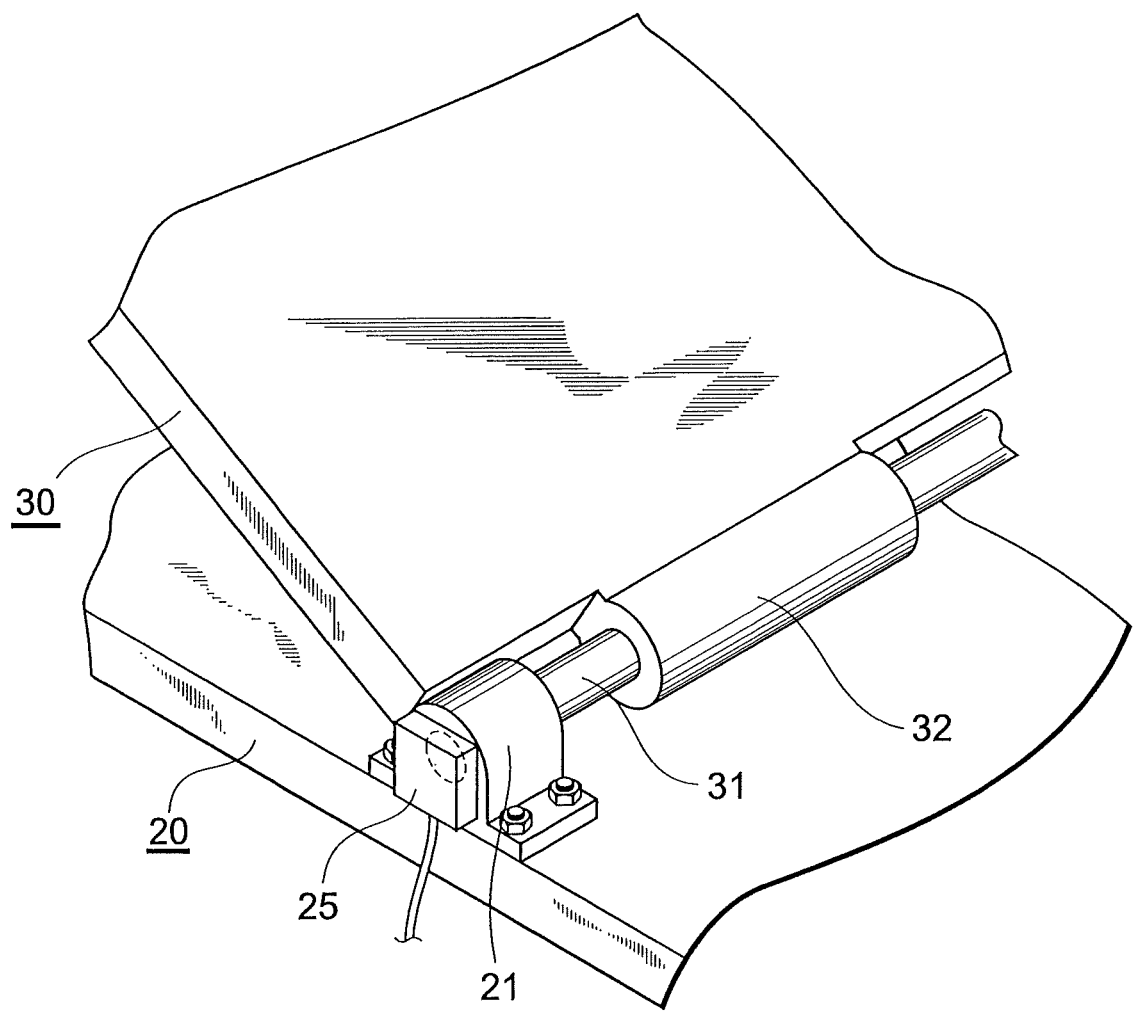
FIG. 26 is a perspective view illustrating the mounting structure of a tilting plate in a dielectrophoresis apparatus.
Figure 29:
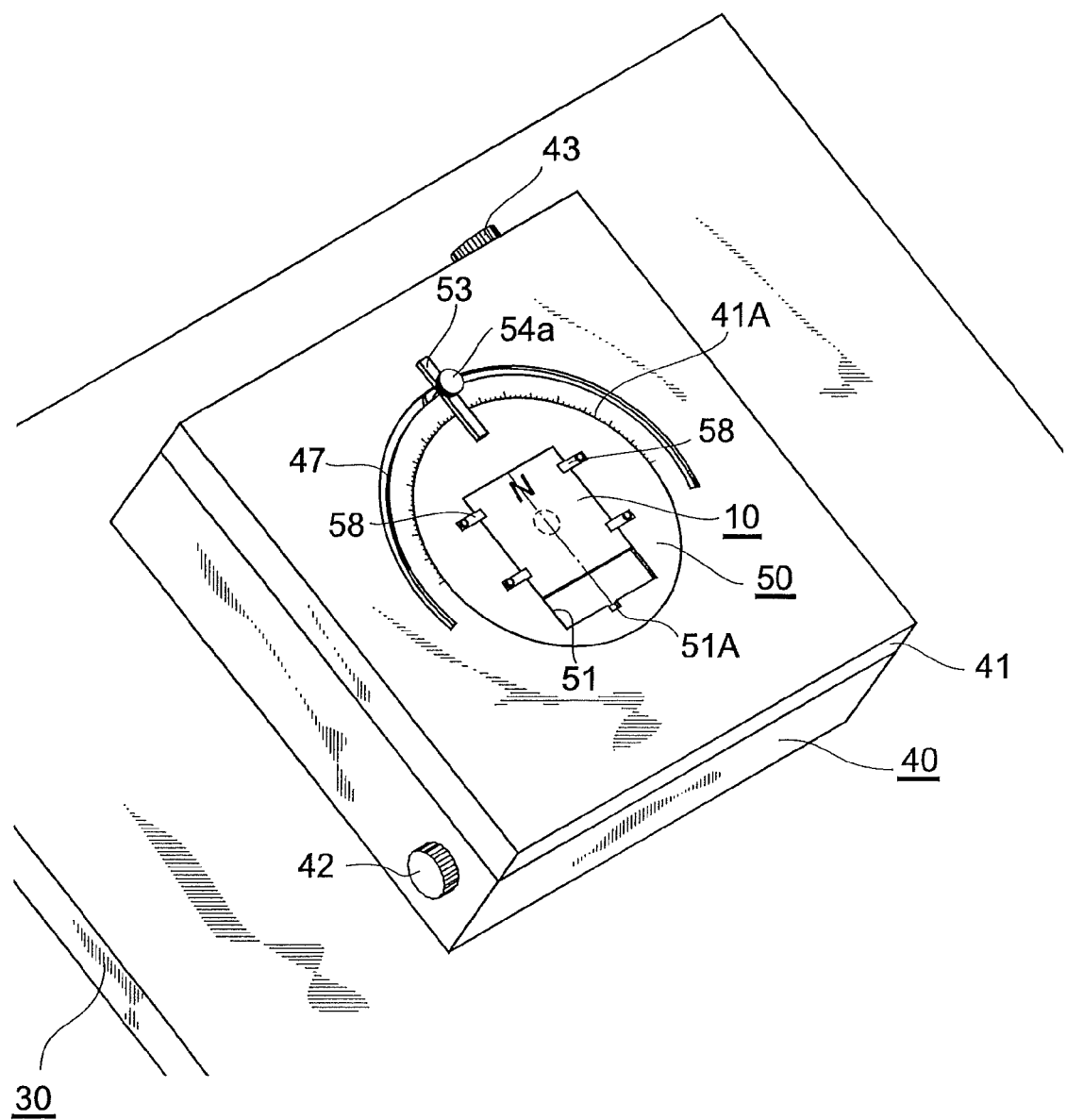
FIG. 29 is a perspective view illustrating the manner in which a rotary disk is provided on an XY table in a dielectrophoresis apparatus.

With reference to FIGS. 25 and 29 in particular, an XY table mechanism 40 is secured on the tilting plate 30. The XY table mechanism 40 has an XY table 41 on the upper portion thereof, and the position of the XY table 41 can be adjusted in the X and Y directions by knobs 42, 43. The surface of the XY table 41 is parallel to the surface of the tilting plate 30. The X direction of the XY table mechanism 40 (the X direction in this coordinate system is different from the X direction along the inclined surface shown in FIG. 1) is a direction in the surface of the XY table 41 and parallel to the rotary shaft 31 of the tilting plate 30. The Y direction is a direction in the surface of the XY table 41 and orthogonal to the X direction.

Figure 30:
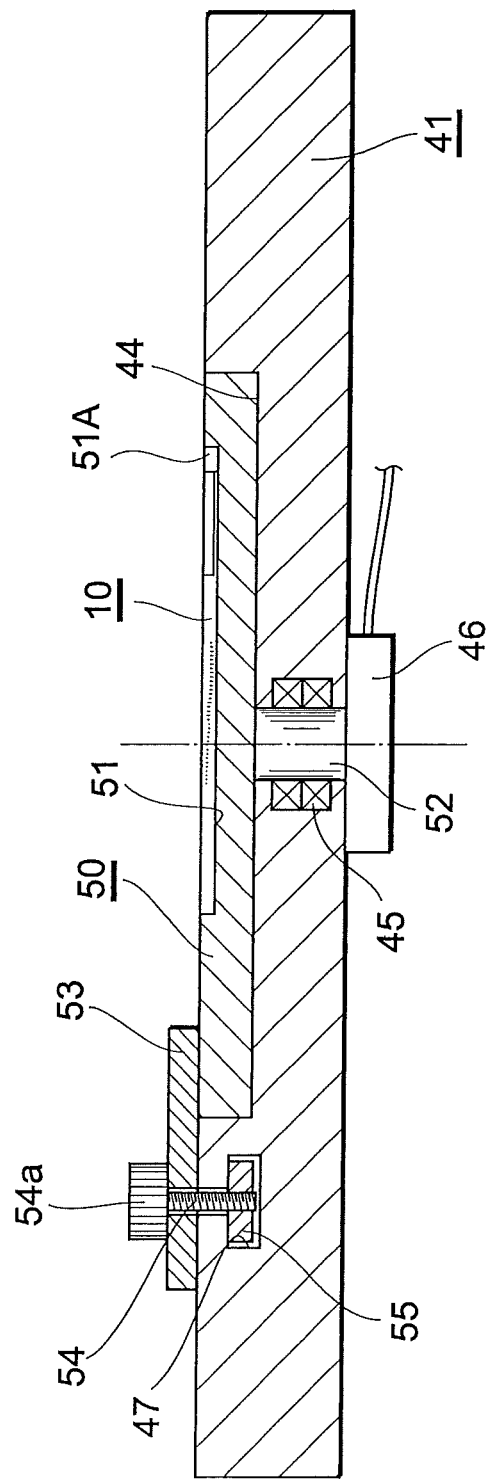
FIG. 30 is a sectional view illustrating the mounting structure of a rotary disk in a dielectrophoresis apparatus.

The rotating mechanism will be described further with reference to FIGS. 29 and 30. The XY table 41 is formed to have a circular recess 44 and the rotary disk 50 is freely rotatably inserted into the recess 44. More specifically, a rotary shaft 52 secured to the lower portion of the rotary disk 50 at the center thereof is freely rotatably received in a bearing 45 provided on the XY table 41. The XY table 41 is provided with a rotation transducer 46 for detecting the rotational angular position (the angle) of the rotary shaft 52 (i.e., the rotary disk 50).

The XY table 41, is formed to have a positioning groove 47 at the periphery of the circular recess 44 along a range of angles greater than 180° (−90° to +90°). The positioning groove 47 is formed to have a large groove width at the lower portion thereof, and a slide 55 is inserted into the groove of large width so as to be freely slidable along the groove.

A handle 53 extending diametrically outward is secured to the circumferential edge of the rotary disk 50. The handle 53 is provided with a hole, a locking screw 54 having a knob 54a is passed through the hole in freely rotatable fashion, and the distal end of the locking screw 54 is screwed into a threaded hole provided in the slide 55.

Accordingly, the rotary disk 50 can be rotated (over a range of at least −90° to +90° manually using the handle 53 and can be fixed to the XY table 41 at any angular position by rotating the knob 54a and then tightening the locking screw 54. The angular position of the rotary disk 50 can be obtained in the form of an electrical signal from the rotation transducer 46 or can be read visually using graduation marks 41A written (engraved) on the XY table 41 at a location along the periphery of the rotary disk 50.

The surface of the rotary disk 50 is formed to have a recess 51 for accommodating the DEP device 10. The recess 51 is formed to have a size that will exactly accommodate the DEP device 10 (the recess 51 may just as well be larger than the DEP device 10), and the DEP device 10 that has been accommodated in the recess 51 cannot move with the exception of movement in the upward direction. The recess 51 is formed to have a cut-out 51A for allowing the DEP device 10 to be removably inserted as by tweezers.

Tabs 58 each comprising a leaf spring are rotatably attached to the rotary disk 50 by pins at a plurality of locations at the periphery of the recess 51. The DEP device 10 accommodated in the recess 51 can be secured more strongly by the tabs 52. It may of course be so arranged this fixing of the DEP device 10 is assured by introducing an adhesive or the like between the bottom face of the recess 51 and the underside of the DEP device 10.

The surface of the rotary disk 50 and the bottom face of the recess 51 are parallel to the surface of the XY table 41 and the surface of the tilting plate 30. Accordingly, the tilt angle of the DEP device 10 (of the surfaces of the glass plate 11 and insulating film 14) accommodated in the recess 51 can be made equal to the tilt angle of the tilting plate 30 and can be measured as the tilt angle of the tilting plate 30. Further, when the angular position of the rotary disk 50 is 0°, the center line N of the electrodes 13A, 13B of DEP device 10 accommodated in the recess 51 coincides with the direction (the Y direction of the XY table 41) for which the angle of the tilted tilting plate 30, XY table 41 and rotary disk 50 is largest. Conversely, the angular position ($\theta_{yaw}$) of the rotary disk 50 when the direction of the center line N coincides with the direction for which the angle is largest is 0°.

Finally, in FIG. 25, a support 63 is secured on the tilting plate 30 and a microscope 60 is supported on the support 63 so as to be freely movable up and down (along the direction perpendicular to the surface of the tilting plate 30). The microscope 60 is placed at a position where the particle P within the DEP device 10 (e.g., the vicinity of the center of rotation of rotary disk 50) set on the rotary disk 50 can be received within the visual field. The position of the visual field of the microscope 60 can be adjusted by moving the XY table 41 along the X and Y directions using the XY table mechanism 40. Focusing of the image of the visual field of microscope 60 can be adjusted by a knob 62. The microscope 60 incorporates a CCD camera (indicated at 61 in FIG. 31) so that a video signal representing the image of the visual field can be obtained. The magnification of the microscope 60 can be adjusted as a matter of course.

Figure 31:
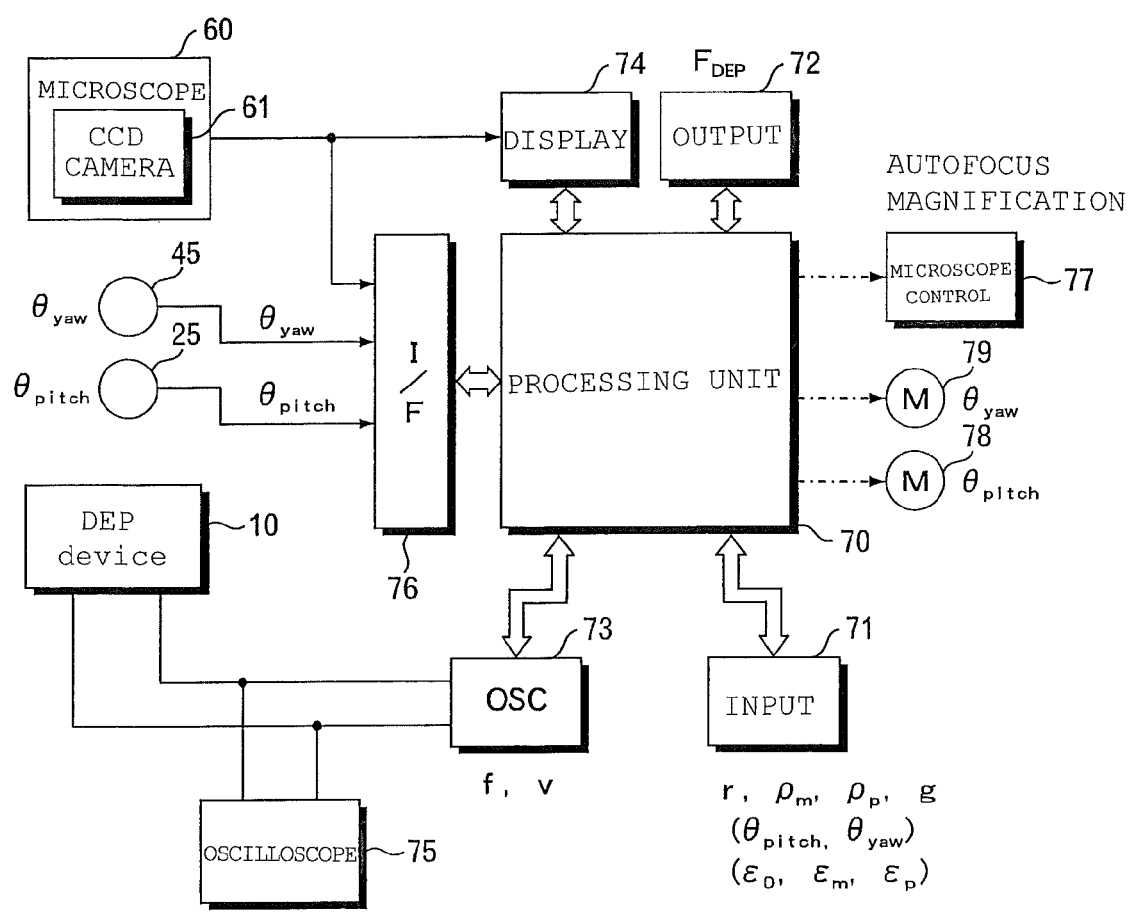
FIG. 31 is a block diagram illustrating the electrical configuration of a dielectrophoresis apparatus.

FIG. 31 illustrates an overview of the electrical configuration of the dielectrophoresis apparatus.

A processing unit 70, which preferably is constituted by a computer system, when dielectrophoretic force, etc., is to be measured, accepts various inputs (described later), executes arithmetic processing in accordance with Equations (1) to (4) cited above, determines the dielectrophoretic force $F_{DEP}$ and intensity E of the electric field, etc., and outputs these to an output unit 72 (printer, display unit, etc.).

A high-frequency generator 73 generates a high-frequency voltage applied across the electrodes 13A, 13B of the DEP device 10. Frequency f and voltage V of this voltage are variable. The waveform of the high-frequency signal generated can be observed using an oscilloscope 75. The frequency f and voltage V of the high-frequency voltage are applied to the processing unit 70. It is also possible for the frequency f and voltage V to be read visually from the waveform display on the oscilloscope 75. It may be so arranged that the processing unit 70 controls the high-frequency generator 73 and changes the frequency f and voltage V.

The tilt angle $\theta_{pitch}$ of tilting plate 30 and angular position $\theta_{yaw}$ of rotary disk 50 detected by the rotation transducers 25 and 45 are input to the processing unit 70 via an interface 76. These angles $\theta_{pitch}$, $\theta_{yaw}$ can be read visually from the graduations 22A, 41A and can be input from an input unit 71 (keyboard, display unit and mouse).

The video signal that is output from the CCD camera 61 inside the microscope 60 is displayed constantly (as a movie) on a display unit 74. The video signal is converted to digital image data by the interface 76 as necessary and is applied to the processing unit 70. The processing unit 70 can be programmed to apply image processing to the digital image data and determine whether the particle P is at rest or not.

Parameters (particle radius r, solution density $\rho_m$, particle density $\rho_p$ and acceleration g of gravitational force, etc.) necessary to calculate dielectrophoretic force $F_{DEP}$ are input to the processing unit 70 from the input unit 71. Permittivity $\in_0$ of air, relative permittivity of $\in_m$ of the solution and relative permittivity $\in_p$ of the particle also are input from the input unit 71 as necessary.

In the most sophisticated form of the apparatus, a microscope control unit 77 for adjusting autofocus and magnification, etc., can be controlled by the processing unit 70 based upon the input digital image data, motors 78, 79 for rotating the rotary shafts 31, 52 can be provided and it can be so arranged that the angle $\theta_{pitch}$ of tilting plate 30 and angle $\theta_{yaw}$ of rotary disk 50 are adjusted so as to bring the particle P to rest under the control of the program executed by processing unit 70.

An example of handling of a dielectric particle and measurement of dielectrophoretic force using this dielectrophoresis apparatus will now be described.

With the DEP device 10 set in the recess 51 of the rotary disk 50 and the angular position of the rotary disk 50 placed at 0° ($\theta_{yaw}=0$), a high-frequency voltage (the frequency f and voltage V of which are made fixed values) is applied across the electrodes 13A and 13B of the DEP device 10.

If the particle P is on the center line N, as illustrated in FIG. 4a, the particle P can be moved or stopped (brought to rest) by changing the angle $\theta_{pitch}$ of the tilting plate 30 (i.e., the DEP device 10). Since the particle P comes to rest when the dielectrophoretic force $F_{DEP}$ acting upon the particle P and the oblique component force $F_G \sin \theta_{pitch}$ of gravity acting upon the particle P are in balance, the dielectrophoretic force $F_{DEP}$ can be found by Equations (3), (4) using the tilt angle $\theta_{pitch}$ prevailing at this time.

In a case where the particle P is not on the central line N, as shown in FIG. 6, the direction of the dielectrophoretic force $F_{DEP}$ is not a direction parallel to the central line N but is inclined with respect to the center line N. Since the oblique component force $F_G \sin \theta_{pitch}$ of gravity acts in a direction parallel to the center line N, a resultant force C of these forces is produced and the particle P is moved through the solution by the force C.

The rotary disk 50 is rotated is such a manner that gravitational force will act in a direction that cancels the resultant force C. When this is done, the dielectrophoretic force $F_{DEP}$ and oblique component force $F_G \sin q_{pitch}$ of gravity come into balance at a certain angular position $\theta_{yaw}$ of the rotary disk 50, as illustrated in FIG. 7. Since Equation (4) holds at this time as well, the dielectrophoretic force $F_{DEP}$ can be calculated using Equations (3), (4).

Figure 23:
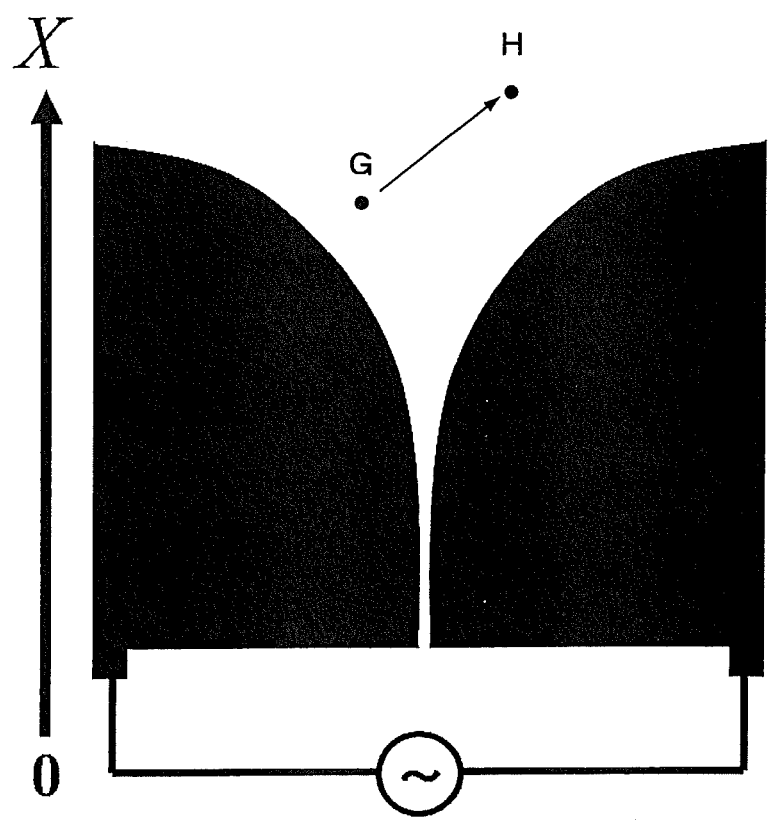
FIG. 23 illustrates the manner in which a dielectric particle is moved (handled)

The particle P at an arbitrary position G in the space within the DEP device 10 can also be moved to another desired position H and stopped at the position H, as illustrated in FIG. 23. Although the most desirable option at this time is to change the tilt angle $\theta_{pitch}$ of the tilting plate 30 and the rotational angle $\theta_{yaw}$ of the rotary disk 50, the voltage V or frequency f applied to the electrodes 13A, 13B may be changed just as well. (It may also be so arranged that the base 20 is tilted or rotated, as will be described later).

Figure 24:
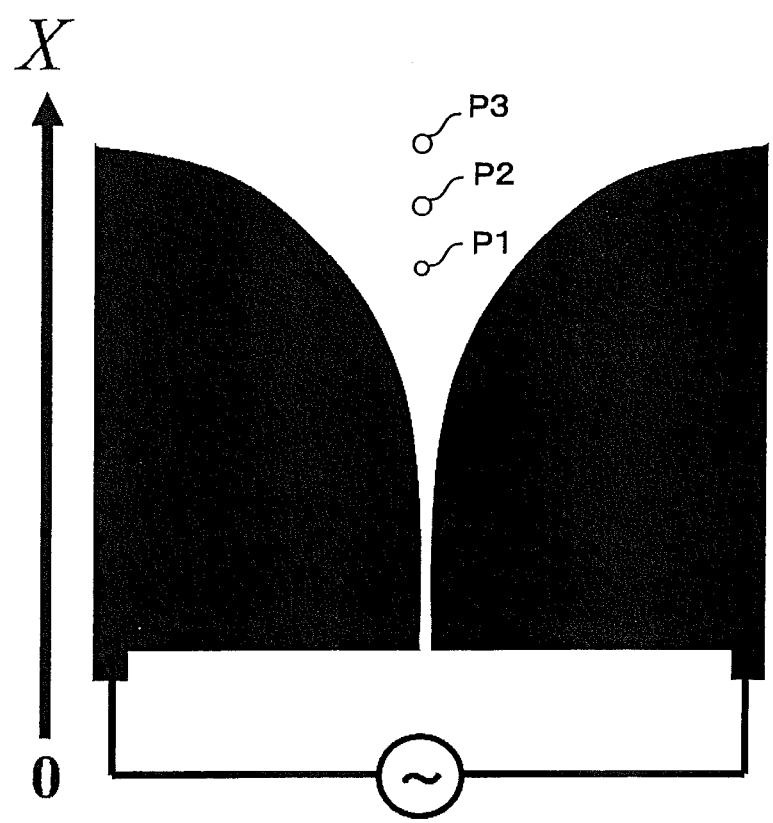
FIG. 24 illustrates a state in which a plurality of dielectric particles have been separated.

The dielectrophoretic force $F_{DEP}$ is a function of the permittivity (relative permittivity) and radius of the particle P, as is evident from Equations (1), (2). This means that it is possible to introduce a plurality of particles of different permittivities or radii into the DEP device 10, adjust the tilt angle $\theta_{pitch}$, rotational angle $\theta_{yaw}$, voltage and frequency (the adjustment including the tilting and rotation of the base 20), move each particle in a respective direction and finally separate the particles, as illustrated in FIG. 24. In FIG. 24, P1, P2 and P3 represent particles of different permittivities or diameters, the particles being separated and positioned along the center line N.

Particle handling and measurement of dielectrophoretic force $F_{DEP}$ takes on various forms from measurement by manual operation to measurement by automatic control.

While images of the electrodes 13A, 13B of the DEP device 10 and particle P (as depicted in FIGS. 4a, 6, 7, 23 and 24) based upon the video signal that is output from the CCD camera 61 of microscope 60 are being displayed on the display unit 74, the motion (velocity and direction) of the particle P is observed and the particle P is moved to a desired position or brought to rest by manually adjusting the tilt $\theta_{pitch}$ of tilting plate 30 and the angle $\theta_{yaw}$ of rotary disk 50. The tilt angle $\theta_{pitch}$ prevailing when the particle is brought to rest can be input manually from the input unit 71 and the processing unit 70 can be made to calculate the dielectrophoretic force $F_{DEP}$. Alternatively, if the angle $\theta_{pitch}$ prevailing when the particle P is brought to rest is loaded from the rotation transducer 25, input by manual operation will not be required. Naturally, the calculation of dielectrophoretic force $F_{DEP}$ may be performed manually rather than causing the processing unit 70 to perform the calculation.

It is possible to load the digital image data obtained from the CCD camera 61 into the processing unit 70, determine the motion (direction and velocity) of the particle P in the processing unit 70 and automatically control the tilt of the tilting plate 30 and the rotation of the rotary disk 50, etc., so as to bring the particle P to rest. The dielectrophoretic force $F_{DEP}$ can be calculated from the tilt angle $\theta_{pitch}$ prevailing when the particle is brought to rest.

The particle P can be moved or brought to rest also by changing the voltage V and frequency of the high-frequency signal applied across the electrodes 13A and 13B (or by holding the tilt angle $\theta_{pitch}$ fixed or by varying this angle) (the angle $\theta_{yaw}$ of the rotary disk 50 can be changed as necessary).

It is also possible to measure the intensity $E_{rpm}$ of the electric field, as mentioned earlier.

(5) Step Response

The fact that the time needed to move or stop a particle within the DEP device falls fully within limits enabling practical use is indicated by the experimental results set forth below.

This experiment was conducted using the DEP device 10 and dielectrophoresis apparatus described above. The particle P was a polystyrene bead having a diameter of 9.9 μm, and the solution was distilled water.

FIGS. 11a, 11b, 12, 13a, 13b and 14 illustrate angular step response.

Figure 14:
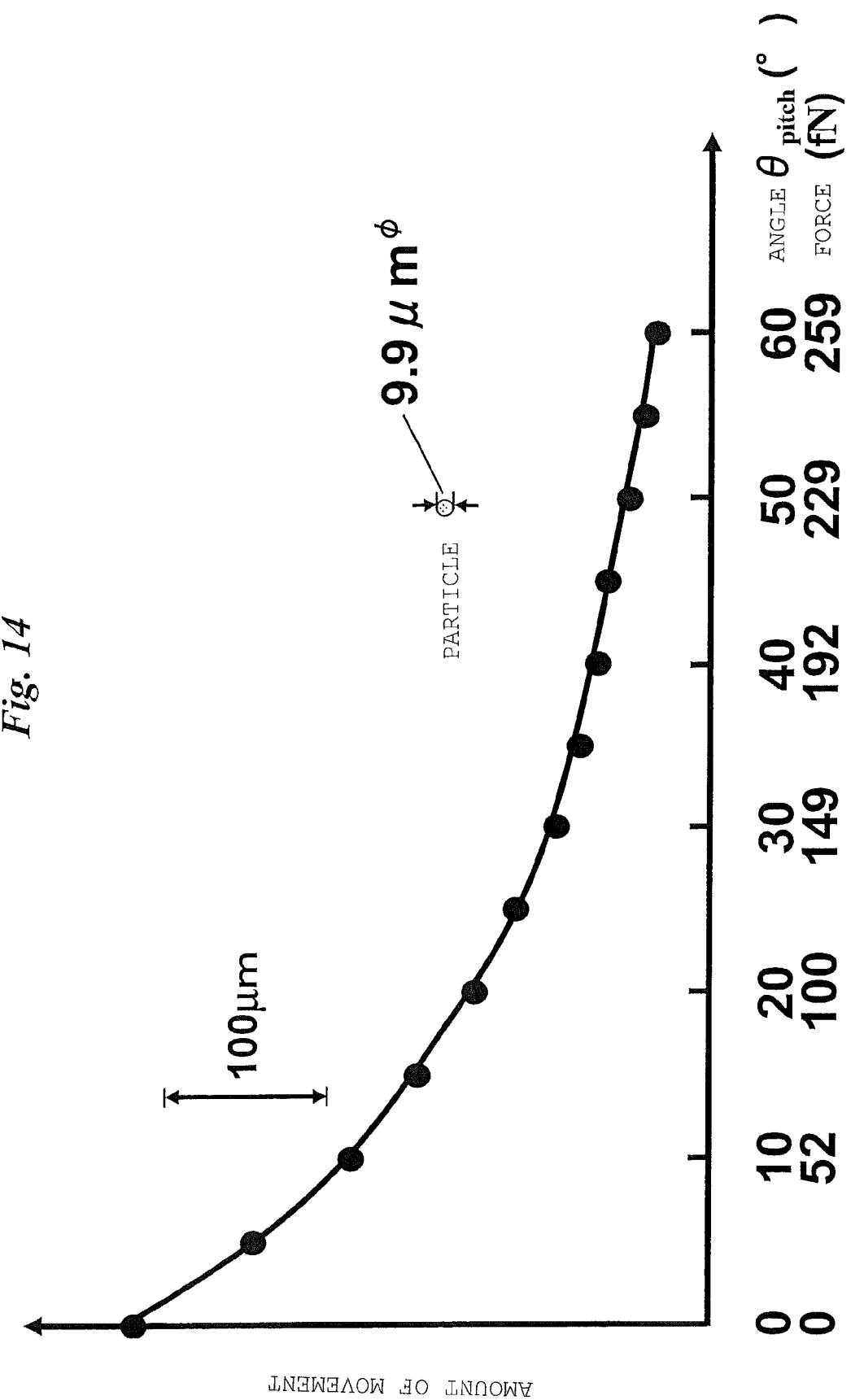
FIG. 14 is a graph illustrating a change in position of a static particle on which an oblique component force of gravity and dielectrophoretic force are in balance, with an angle $\theta_{pitch}$ being plotted along the horizontal axis.

Angular step response was obtained by varying the angle $\theta_{pitch}$ suddenly from 60° to 15° (from B to A) and from 15° to 60° (from A to B) under conditions of an applied voltage of 20 Vpp and frequency of 1 MHz (see FIGS. 12, 13a and 13b) and measuring the amount of movement of the particle. The time constant of movement from point B to point A is 3 min, and the time constant of movement from point A to point B is 1.9 min (see FIGS. 11a and 11b). FIG. 14 is a graph illustrating a change in at-rest position (amount of movement) of a particle on which an oblique component force of gravity and dielectrophoretic force are in balance, with the angle $\theta_{pitch}$ being plotted along the horizontal axis. It will be understood that the larger the angle $\theta_{pitch}$, the lower the position at which balance is achieved.

Figure 15B:
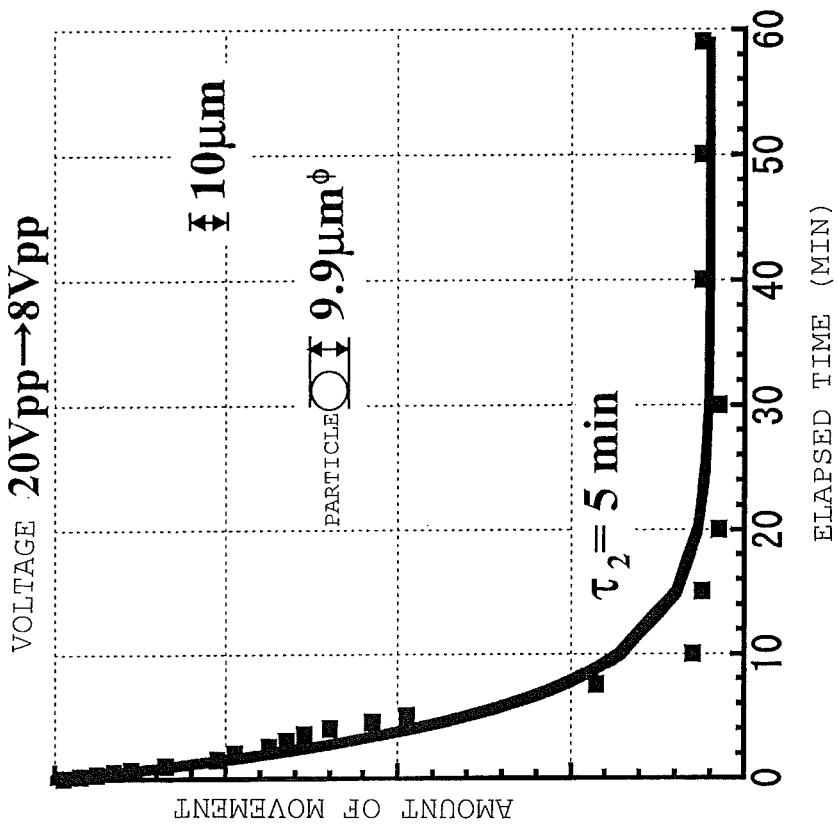
FIGS. 15a and 15b are graphs illustrating amounts of movement of a particle, with the passage of time, when voltage is changed suddenly from 8 Vpp to 20 Vpp and from 20 Vpp to 8 Vpp, respectively.
Figure 15A:
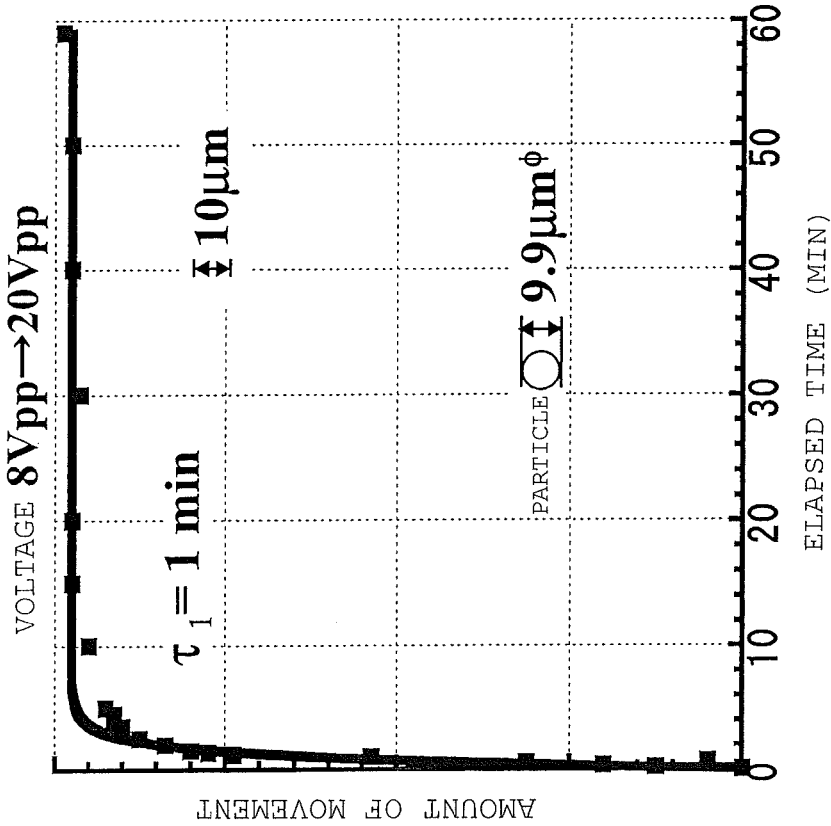
Figure 16:
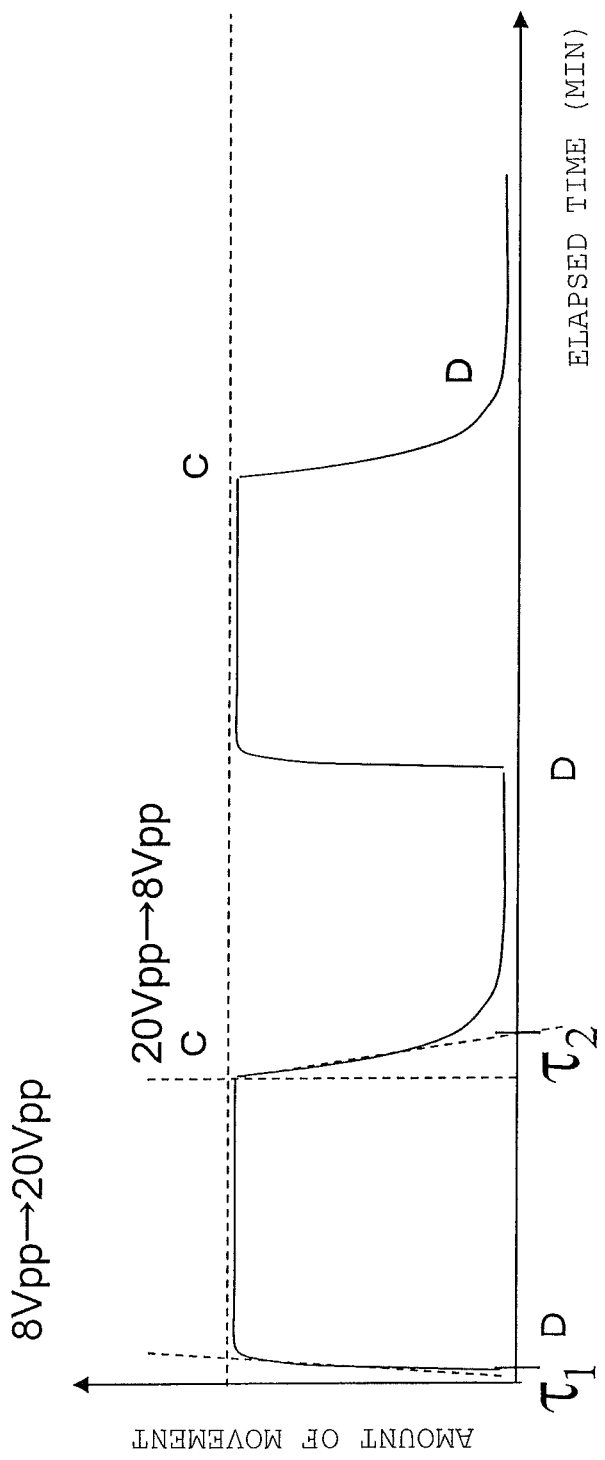
FIG. 16 is a graph illustrating successive voltage step responses over a plurality of times.
Figure 17B:
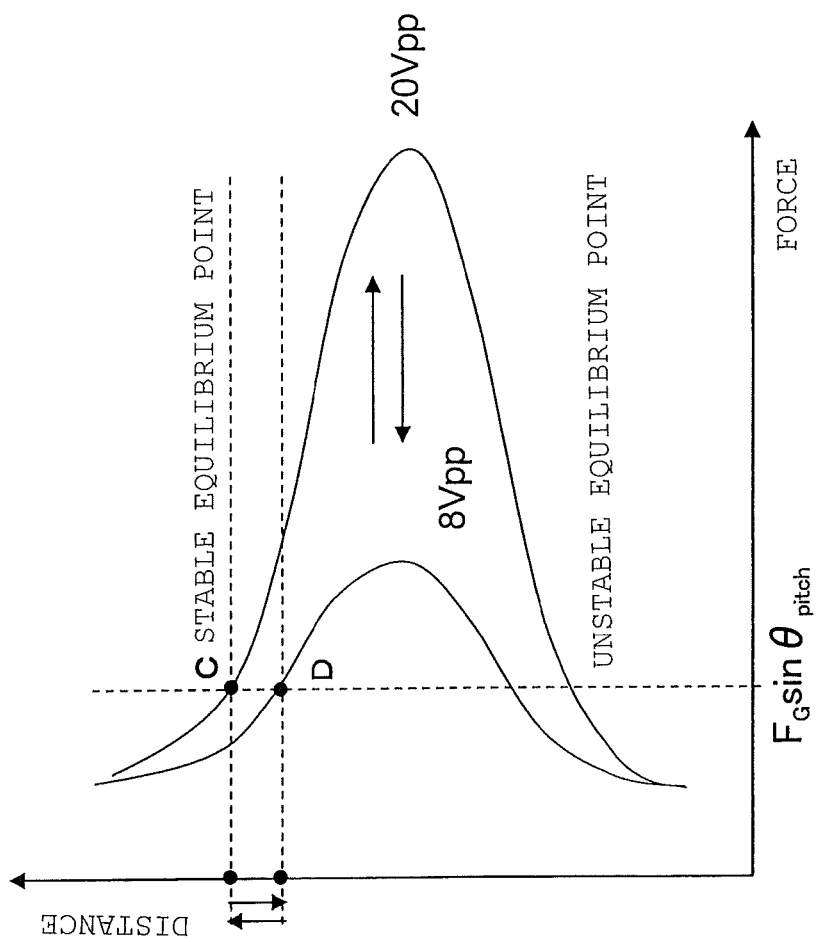
FIG. 17b is a graph illustrating a stable equilibrium point at every voltage.
Figure 17A:
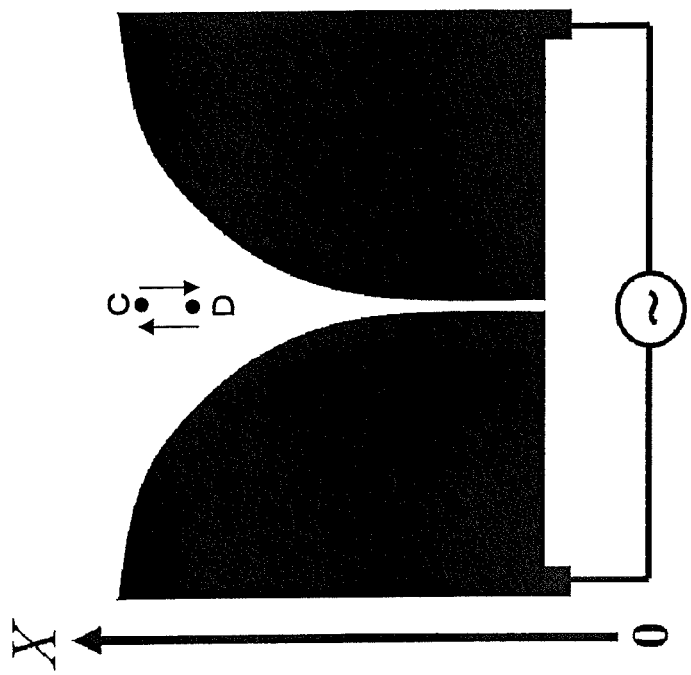
FIG. 17a illustrates positions of a particle in voltage step response.
Figure 18:
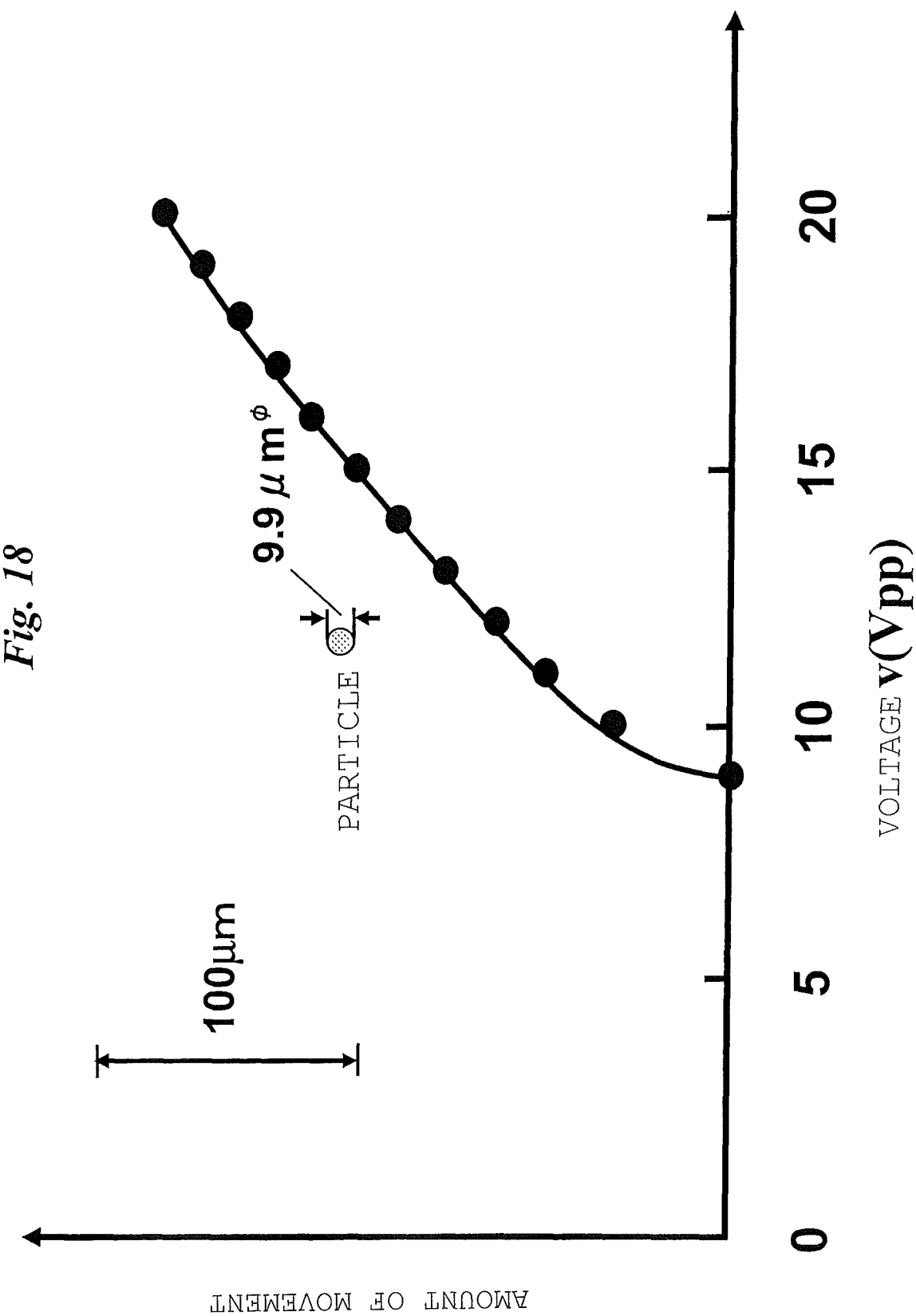
FIG. 18 is a graph illustrating a change in position of a static particle on which an oblique component force of gravity and dielectrophoretic force are in balance, with a voltage Vpp being plotted along the horizontal axis.

Voltage step response was obtained by varying voltage suddenly from 8 Vpp to 20 Vpp (from D to C) and from 20 Vpp to 8 Vpp (from C to D) under conditions of a frequency of 1 MHz and angle $\theta_{pitch}$=30° (149 fN) (see FIGS. 16, 17a and 17b) and measuring the amount of movement of the particle. The time constant of movement from point D to point C is 1 min, and the time constant of movement from point C to point D is 5 min (see FIGS. 15a and 15b). The at-rest position moves upward as the voltage rises (see FIG. 18).

Figure 19B:
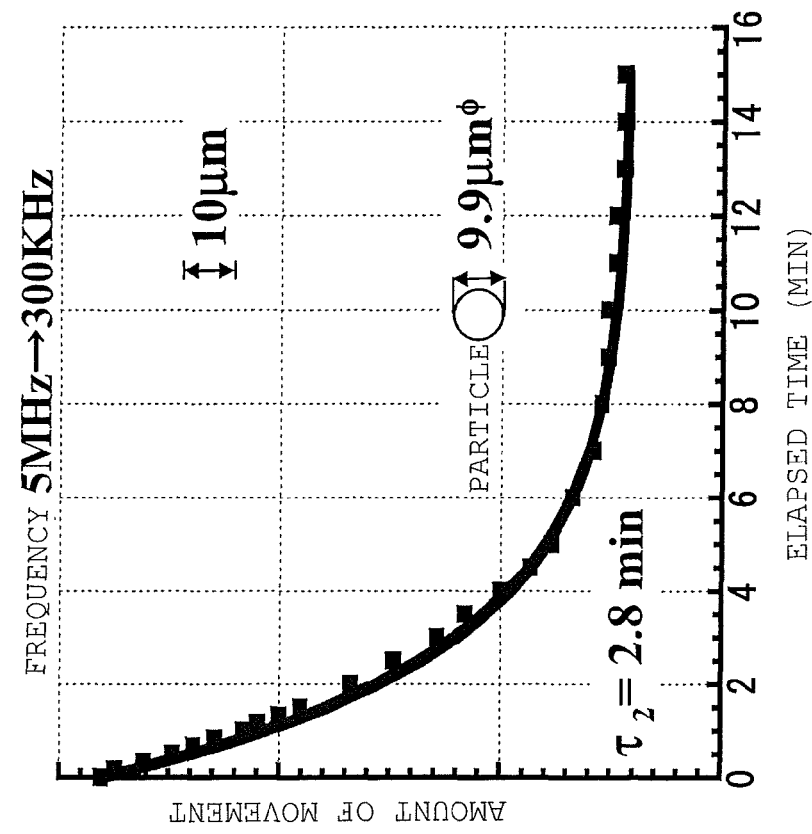
FIGS. 19a and 19b are graphs illustrating amounts of movement of a particle, with the passage of time, when a frequency f is changed suddenly from 300 KHz to 5 MHz and from 5 MHz to 300 KHz, respectively.
Figure 19A:
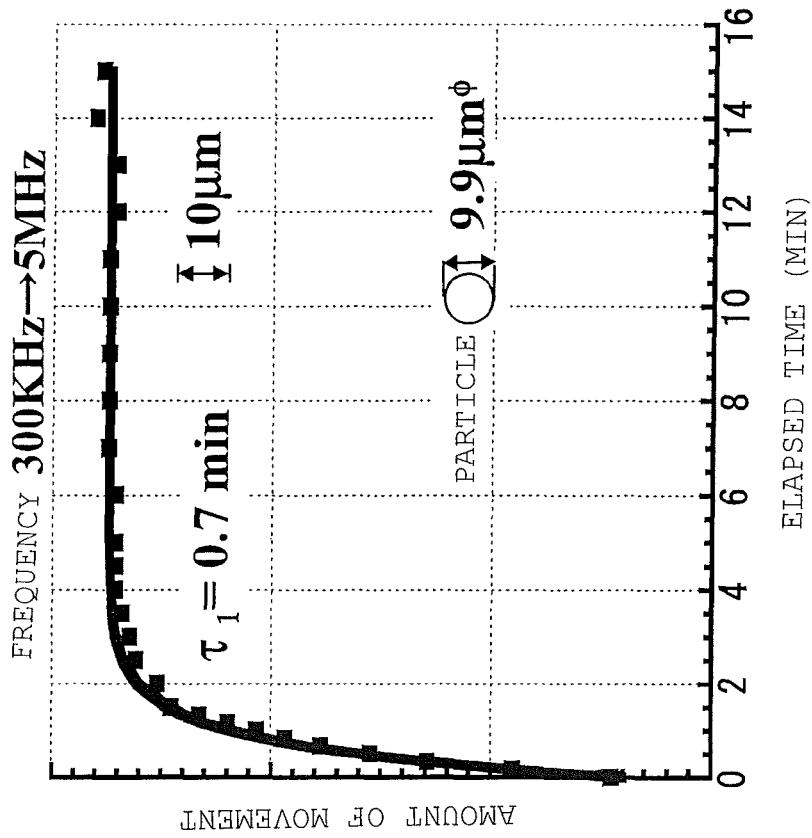
Figure 20:
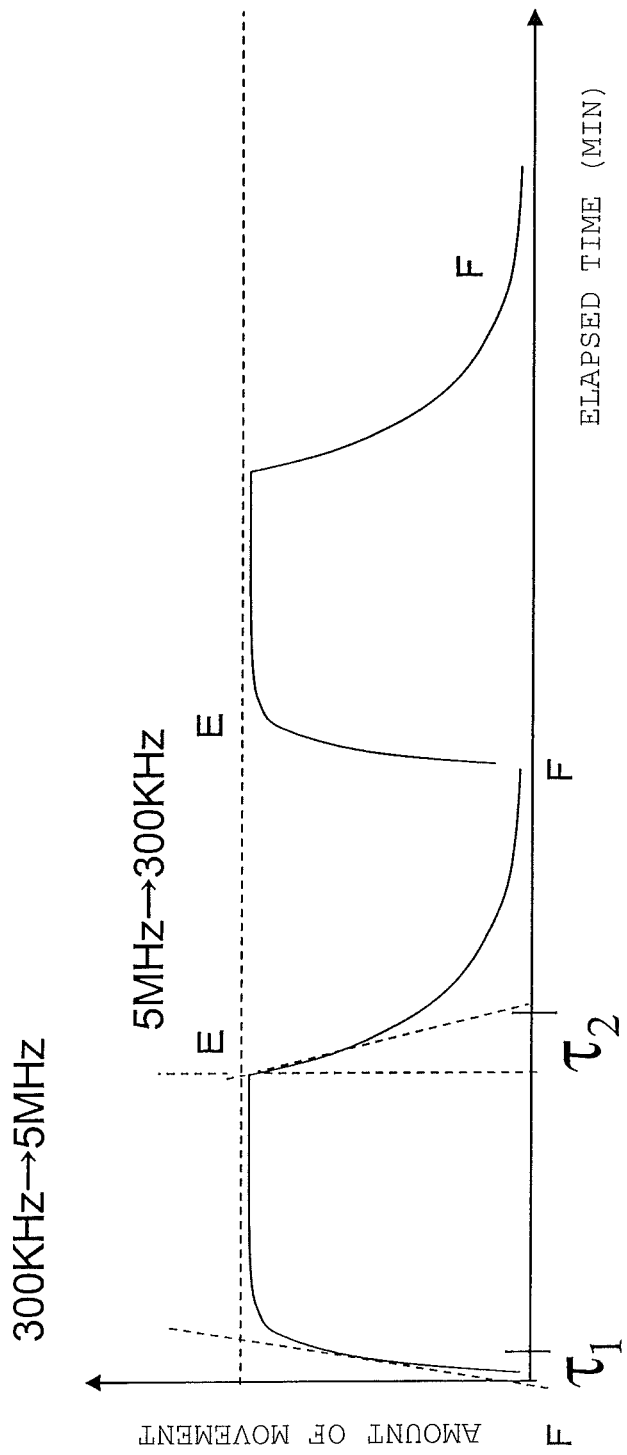
FIG. 20 is a graph illustrating successive frequency step responses over a plurality of times.
Figure 22:
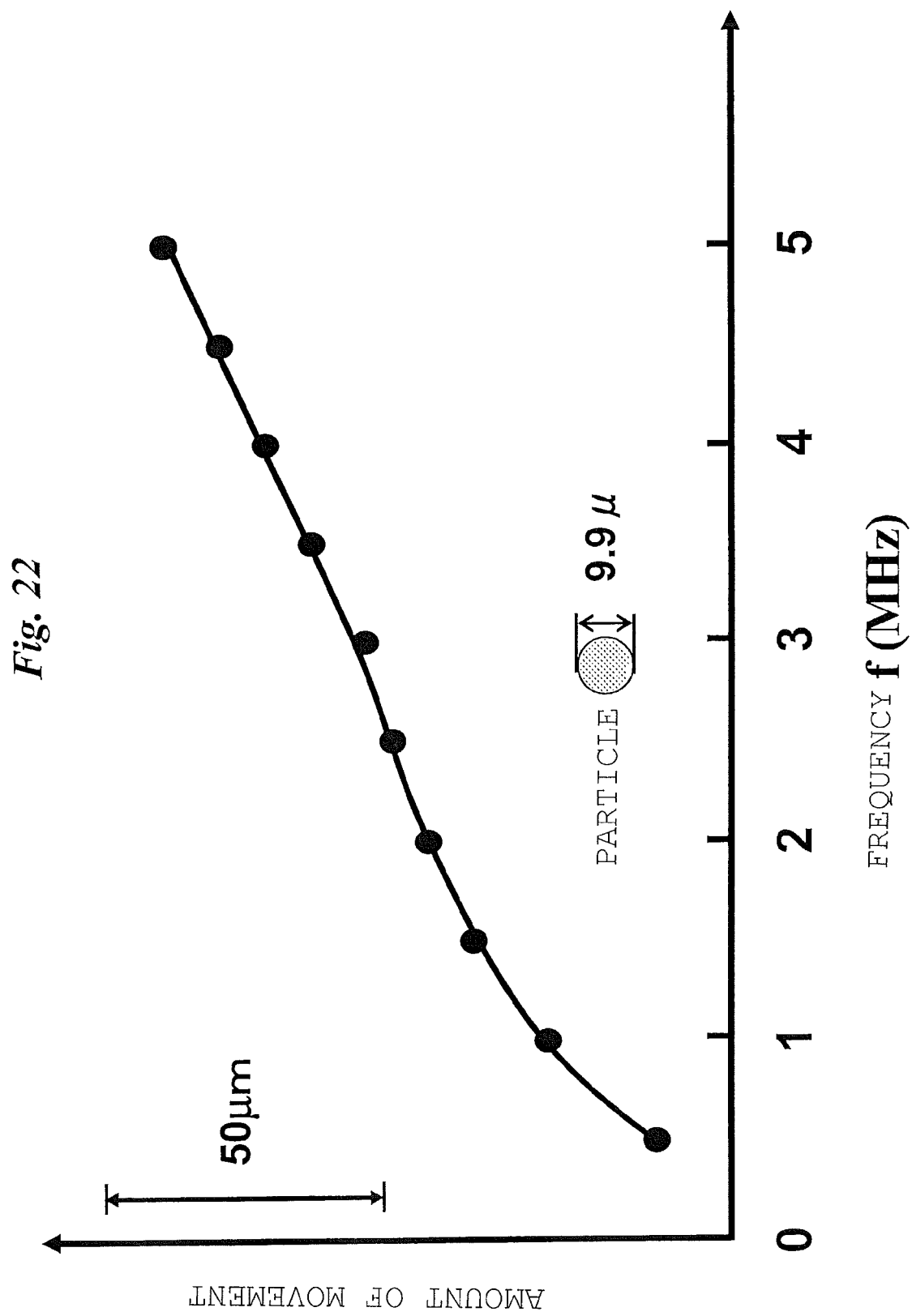
FIG. 22 is a graph illustrating a change in position of a static particle on which an oblique component force of gravity and dielectrophoretic force are in balance, with a frequency f being plotted along the horizontal axis.

The frequency characteristic was obtained by varying frequency suddenly from 300 KHz to 5 MHz (from F to E) and from 5 MHz to 300 KHz (from E to F) under conditions of an applied voltage of 15 Vpp and angle $\theta_{pitch}$=30° (149 fN) (see FIGS. 20, 21a and 21b) and measuring the amount of movement of the particle. The time constant of movement from point F to point E is 0.7 min, and the time constant of movement from point E to point F is 2.8 min (see FIGS. 19a and 19b). The at-rest position moves upward as the voltage rises (see FIG. 22).

Thus, the time constant in each step response is within several minutes and the steady state is achieved in about 15 min. This is a speed of response that can fully meet practical use.

(6) Modification

Figure 32:
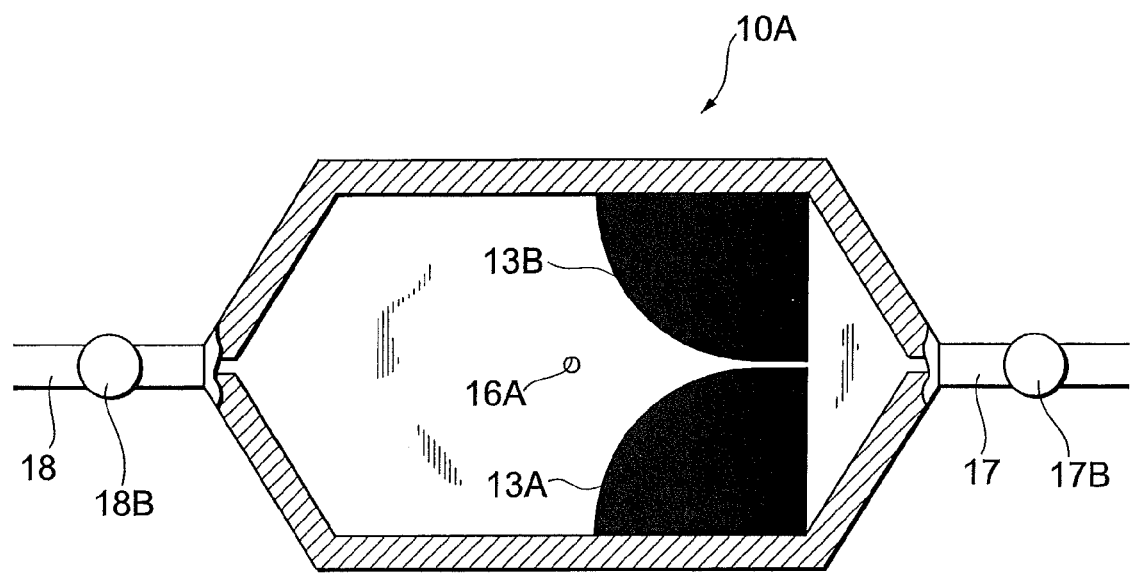
FIG. 32 is a plan view illustrating a modification of a DEP device, in which a portion of the device has been cut away.

Thus, as described above, it is possible to handle dielectric particles and to measure dielectrophoretic force using a dielectrophoresis apparatus. FIGS. 32 *and* 33 illustrate an example of a DEP device in which it is possible to broaden further the range of particle handling.

The basic structure of this DEP device 10A is the same as that shown in FIGS. 2 and 3. Accordingly, an illustration of the details of the structure is omitted and only electrodes 13A, 13B are shown.

The DEP device 10A has a solution injection port 17A at the center of one end thereof, and a solution discharge port 18A at the center of the other end thereof. Connected to the solution injection port 17A and solution discharge port 18A are a solution injection tube 17 and discharge tube 18, respectively, and the tubes 17, 18 are provided with valves (cocks or valves) 17B, 18B, respectively. A particle suction port (trap port) 16A is provided in a lower plate on the center line between the electrodes or at another suitable position, and a suction tube 16 is connected to this port.

By way of example, the DEP device 10A can be used to sort only one particle from among a number of particles (small target bodies) that have been introduced into the DEP device. Specifically, by adjusting the angle $\theta_{pitch}$ or angle $\theta_{yaw}$ or the voltage or frequency (and the inclination or rotation of the base 20 if necessary) in the manner set forth above, a specific particle is made to move to the position of the suction port 16A and is sucked in and saved in the suction tube 16 (or in a suitable trap connected thereto). Under these conditions the solution is injected into the DEP device 10A from the injection port 17A through the injection tube 17 and other particles present inside the device are discharged through the discharge port 18A and discharge tube 18. The specific particle that has been saved in the suction tube 16 is then returned to the interior of the DEP device 10A. Thus, only the specific particle is capable of being reserved inside the DEP device 10A. In the course of the above-described sorting operation, the valves 17B, 18B are opened and closed when the solution is injected and discharged. The suction tube 16 may be provided with a valve as necessary.

Particle movement can be speeded up by suddenly tilting or suddenly rotating the DEP device or by suddenly varying the voltage or frequency, as will be understood from the above-described step response. In the handling of particles, therefore, it will suffice to produce the above-mentioned sudden changes and cause the particle to move toward a target position and then to finely adjust the angle, voltage or frequency when the particle comes near the target position. At this time the base 20 may itself be rotated (through rotation $\theta_{roll}$ about the X axis when the X axis shown in FIG. 10 has been rotated through $\theta_{pitch}$ in the reverse direction and moved onto the base 20) as necessary, or the base 20 may be rotated in the direction of $\theta_{pitch}$.

Figure 33:
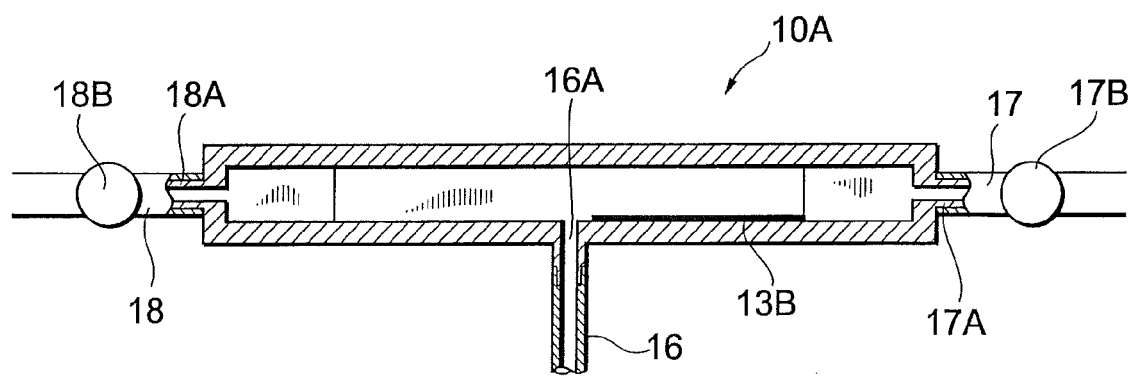
FIG. 33 is a longitudinal sectional view of FIG. 32.

In the foregoing embodiment, a rotary disk is used in order to mount and rotate the DEP device. However, a disk-shaped body is not necessarily required. In particular, in the case of the DEP device 10A provided with the suction port 16A and suction tube 16 shown in FIGS. 32 and 33, a rotary body having a shape suitable for supporting this should be used. Likewise, it goes without saying that a tilting body that is not plate-shaped can be used instead of the tilting plate of the tilting mechanism.

Furthermore, in the foregoing embodiment, the pair of electrodes 13A, 13B are used. However, multiple pairs of electrodes may be arranged longitudinally (along the vertical direction) in spaced-apart relation, or they may be arranged transversely. In the case of the transverse arrangement, two mutually adjacent electrodes (which belong to different pairs) may be integrated.

The invention claimed is:

1. A dielectrophoresis apparatus comprising:
a case for being filled with a dielectric solution and for admitting a small target body that includes a dielectric portion;
an electrode device consisting of a pair of electrodes, between which an alternating voltage is applied, for forming within said case a non-uniform alternating electric field that produces at least one stable equilibrium point in relation to balance between a dielectrophoretic force acting upon the small target object inside said case and a force ascribable to gravity and buoyancy; and
a tilting mechanism for holding said case and said electrode device at a titled orientation,
wherein said tilting mechanism comprises a first member holding said case and said electrode device, a second member for pivotably supporting said first member, and means for holding said first member in an oblique state with respect to said second member, and
wherein mutually opposing sides of said pair of electrodes in said electrode device are in line symmetry with respect to a center line between the electrodes of the pair, portions of the electrodes of the pair being narrowly spaced apart and other portions curving in such a manner that the electrode spacing gradually increases.

2. A dielectrophoresis apparatus according to claim 1, further comprising a rotating mechanism for rotating said case and said electrode unit in a plane having a tilt determined by said tilting mechanism.

3. A dielectrophoresis apparatus according to claim 1, further comprising an alternating voltage generating device for generating the alternating voltage, at least the frequency or voltage of which is variable.

4. A dielectrophoresis apparatus according to claim 2, wherein angle of tilt produced by said tilting mechanism and angle of rotation produced by said rotating mechanism are measurable.

5. The dielectrophoresis apparatus according to claim 1, wherein the curving portions of the electrodes curve in a gradual manner.

6. The dielectrophoresis apparatus according to claim 1, wherein the electrode device includes no electrodes other than said pair of electrodes.

7. A method of handling a small body utilizing dielectrophoresis, comprising:
using the dielectrophoresis apparatus set forth in claim 1;
filling the interior of said case with a dielectric solution and admitting a small target body;
applying an alternating voltage to said plurality of electrodes of said electrode device and forming a non-uniform electric field within said case; and
adjusting direction and angle of tilt of said case so as to produce an imbalance between a dielectrophoretic force acting upon the small target body inside said case and a force ascribable to gravity and buoyancy, and causing the small target body to move in a desired direction,
wherein said case is disposed at a tilted orientation after said adjusting step is conducted.

8. A method of sorting small bodies utilizing dielectrophoresis, comprising:
filling the interior of a case with a dielectric solution and admitting small target bodies of a plurality of different types, each target body including a dielectric portion;
forming a non-uniform alternating electric field within said case; and
adjusting direction and angle of tilt of said so as to produce an imbalance between a dielectrophoretic force acting upon the small target bodies inside said case and a force ascribable to gravity and buoyancy, causing the small target bodies of the plurality of different types to move in individual directions, and causing a small target body of a desired type to stop at a desired stable equilibrium point,
wherein the dielectrophoresis apparatus is a dielectrophoresis apparatus as claimed in claim 1.

9. A method of measuring dielectrophoretic force of a small body utilizing electrophoresis, comprising:
filling the interior of a case with a dielectric solution and admitting a small target body that includes a dielectric portion;
forming a non-uniform alternating electric field within said case;
adjusting at least one of intensity and frequency of the non-uniform alternating electric field and direction and angle of tilt of said case, balancing a dielectrophoretic force acting upon the small target body inside said case and a force ascribable to gravity and buoyancy, and causing said small body to come to rest; and
calculating dielectrophoretic force using a tilt angle of said case in a prescribed direction prevailing when the small body is brought to rest, wherein the dielectrophoresis apparatus is a dielectrophoresis apparatus as claimed in claim 1.

10. A method of handling a small body utilizing dielectrophoresis, comprising:
filling the interior of a case with a dielectric solution, the case having therein a pair of electrodes with mutually opposing sides that are in line symmetry with respect to a center line between the electrodes, portion of the electrodes being narrowly spaced apart and other portions curving in such a manner that the electrode spacing gradually increases;
admitting into the case a small target body that includes a dielectric portion;
forming a non-uniform alternating electric field within said case by applying an alternating voltage between the electrodes; and
adjusting a direction and angle of tilt of said case so as to produce an imbalance between a dielectrophoretic force acting upon the small target body inside said case and a force ascribable to gravity and buoyancy, and causing the small target body to move in a desired direction, wherein the adjusting step comprises rotating a first member that supports the case with respect to a second member to which the first member is pivotably connected, and wherein said case is disposed at a tilted orientation after said adjusting step is conducted.

11. A handling method according to claim 10, wherein the small target body is stopped at a stable equilibrium point.

12. A method described in claim 10, wherein the small target body is a biological cell.

13. A handling method according to claim 10, wherein the curving portions of the electrodes curve in a gradual manner.

14. A method of sorting small bodies utilizing dielectrophoresis, comprising:

filling the interior of a case with a dielectric solution, the case having therein a pair of electrodes with mutually opposing sides that are in line symmetry with respect to a center line between the electrodes, portion of the electrodes being narrowly spaced apart and other portions curving in such a manner that the electrode spacing gradually increases;

admitting small target bodies of a plurality of different types, each target body including a dielectric portion;

forming a non-uniform alternating electric field within said case by applying an alternating voltage between the electrodes; and adjusting direction and angle of tilt of said case so as to produce an imbalance between a dielectrophoretic force acting upon the small target bodies inside said case and a force ascribable to gravity and buoyancy, causing the small target bodies of the plurality of different types to move, and causing a small target body of a desired type to stop at a desired stable equilibrium point, wherein the adjusting step comprises rotating a first member that supports the case with respect to a second member to which the first member is pivotably connected, and wherein said case is disposed at a tilted orientation after said adjusting step is conducted.

15. A handling method according to claim 14, wherein the curving portions of the electrodes curve in a gradual manner.

* * * * *